US 9,232,090 B2

(12) United States Patent
Seto

(10) Patent No.: US 9,232,090 B2
(45) Date of Patent: Jan. 5, 2016

(54) ELECTRONIC APPARATUS AND IMAGE FORMING APPARATUS WITH IMPROVED DISPLAYS OF DIFFERENT LEVELS OF MENU ITEMS

(71) Applicant: KYOCERA Document Solutions, Inc., Osaka (JP)

(72) Inventor: Akifumi Seto, Osaka (JP)

(73) Assignee: Kyocera Document Solutions Inc. (JP)

( * ) Notice: Subject to any disclaimer, the term of this patent is extended or adjusted under 35 U.S.C. 154(b) by 238 days.

(21) Appl. No.: 13/898,498

(22) Filed: May 21, 2013

(65) Prior Publication Data

US 2013/0321836 A1 Dec. 5, 2013

(30) Foreign Application Priority Data

May 30, 2012 (JP) .................................. 2012-122874
Jan. 21, 2013 (JP) .................................. 2013-008089

(51) Int. Cl.
*G06F 3/048* (2013.01)
*H04N 1/00* (2006.01)

(52) U.S. Cl.
CPC ....... *H04N 1/00392* (2013.01); *H04N 1/00427* (2013.01); *H04N 1/00472* (2013.01); *H04N 1/00474* (2013.01); *H04N 1/00482* (2013.01); *H04N 2201/0094* (2013.01)

(58) Field of Classification Search
CPC .................................................. H04N 1/00392
See application file for complete search history.

(56) References Cited

U.S. PATENT DOCUMENTS

| 6,788,319 | B2 * | 9/2004 | Matsumoto | G06F 3/0482 |
| | | | | 348/E5.105 |
| 7,017,122 | B1 * | 3/2006 | Lee | G06F 3/0482 |
| | | | | 348/E5.104 |
| 7,584,427 | B2 * | 9/2009 | Machida | H04N 1/00411 |
| | | | | 715/708 |
| 2001/0019554 | A1 * | 9/2001 | Nomura | H04L 45/50 |
| | | | | 370/389 |
| 2005/0076309 | A1 * | 4/2005 | Goldsmith | G06F 3/0482 |
| | | | | 715/811 |
| 2005/0275648 | A1 * | 12/2005 | Park | 345/204 |
| 2006/0066929 | A1 * | 3/2006 | Miyazawa | G06K 15/005 |
| | | | | 358/540 |
| 2007/0186190 | A1 * | 8/2007 | Nakashima | G01C 21/3611 |
| | | | | 715/841 |
| 2008/0307355 | A1 * | 12/2008 | Yokota | G06F 3/0488 |
| | | | | 715/808 |

(Continued)

FOREIGN PATENT DOCUMENTS

JP H06-162125 6/1994
JP 2003-084965 3/2003

(Continued)

OTHER PUBLICATIONS

Firefox, Firefox3.6.17-DropDownMenus.pdf, Apr. 21, 2011.*

*Primary Examiner* — Tadeese Hailu

(57) ABSTRACT

In an electronic apparatus, a memory unit stores relation information to relate selectable items to be selected by a user in a layered tree structure, and a display control unit performs a first step and a second step. The first step causes a display unit to display a first window in which plural selectable items in a layer is displayed. The second step causes the display unit to display a second window in which selectable items are displayed while the plural selectable items are displayed in the first window, if one of the plural selectable items is selected in the first window; and the selectable items displayed in the second window are related with the selected selectable item and are located in a layer lower than the layer of the selected selectable item by one layer in the relation information.

9 Claims, 16 Drawing Sheets

(56) References Cited

U.S. PATENT DOCUMENTS

2011/0292416 A1* 12/2011 Tsai ............................... 358/1.9
2012/0019554 A1* 1/2012 Narimatu ............ G06F 3/04883
                                                          345/629

FOREIGN PATENT DOCUMENTS

| JP | 2004-265244 | 9/2004 |
|----|-------------|--------|
| JP | 2009-230159 | 10/2009 |

* cited by examiner

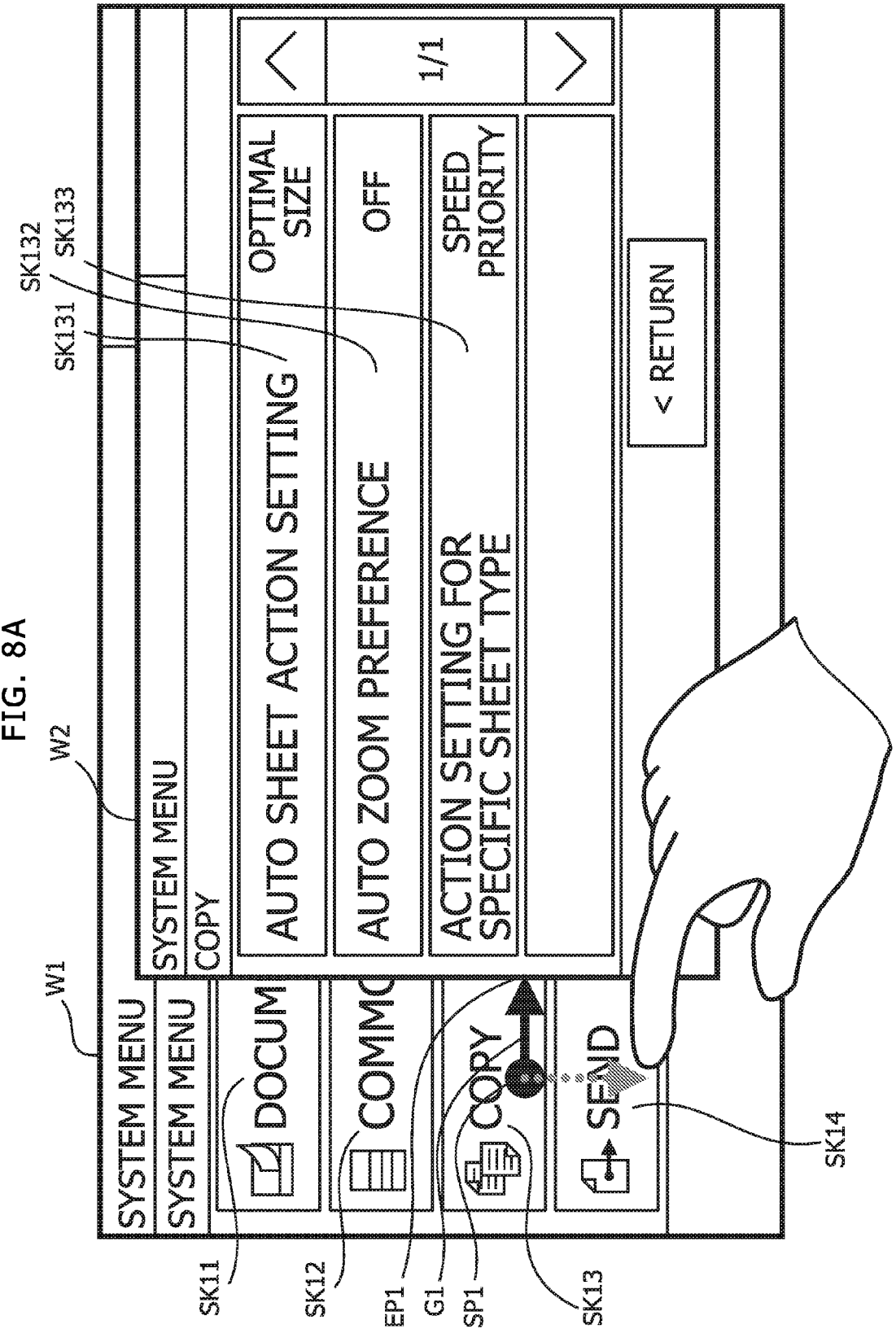

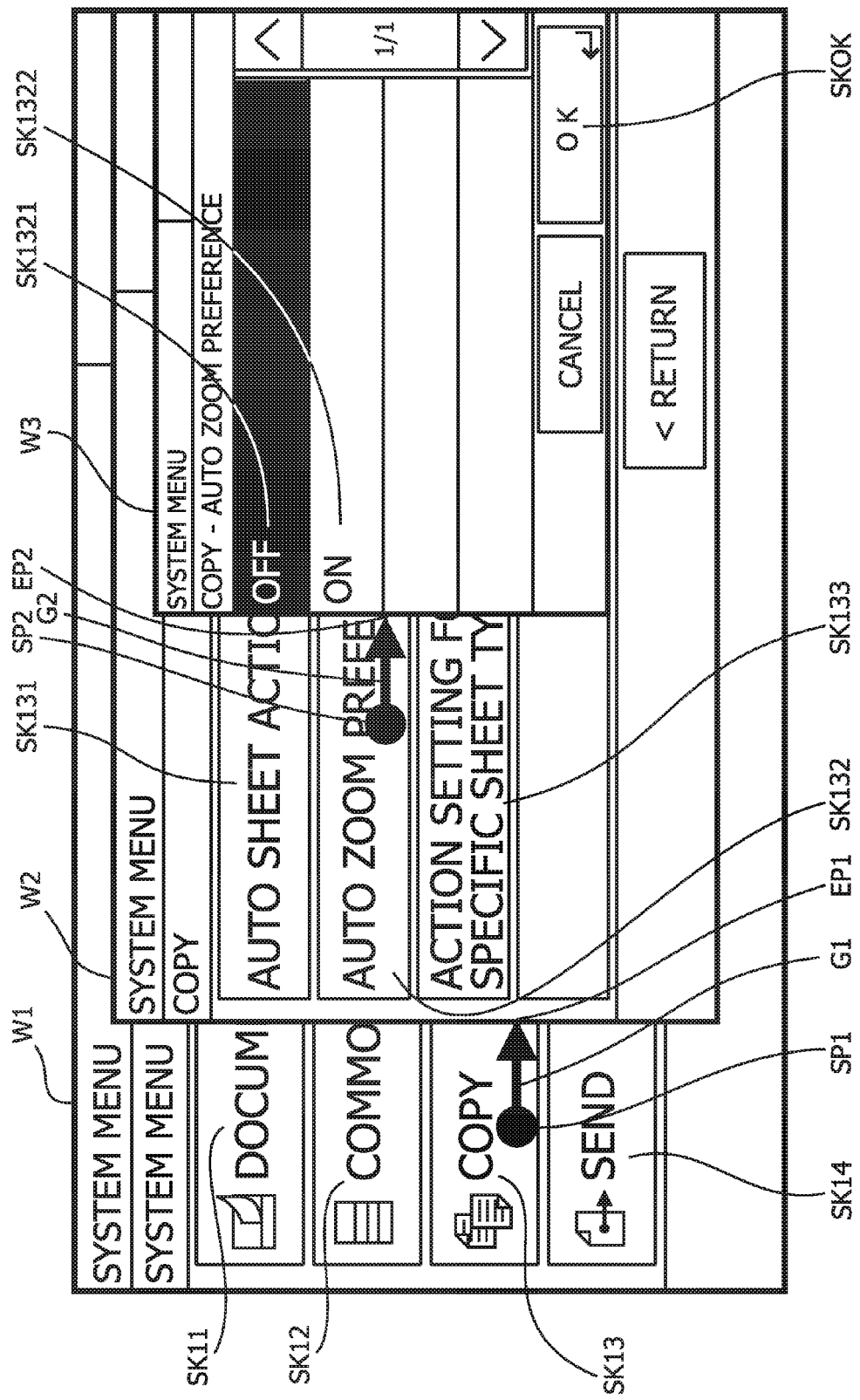

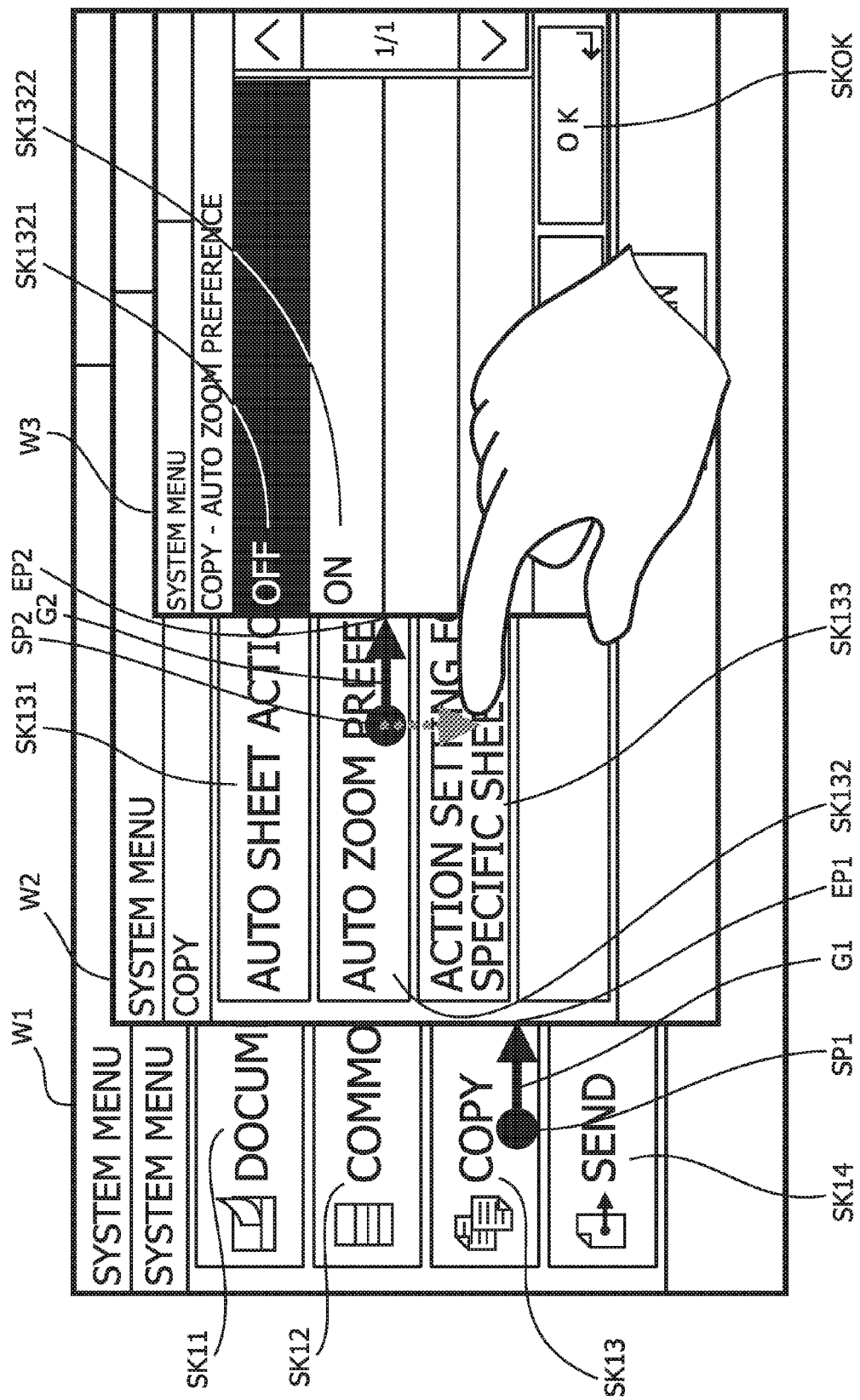

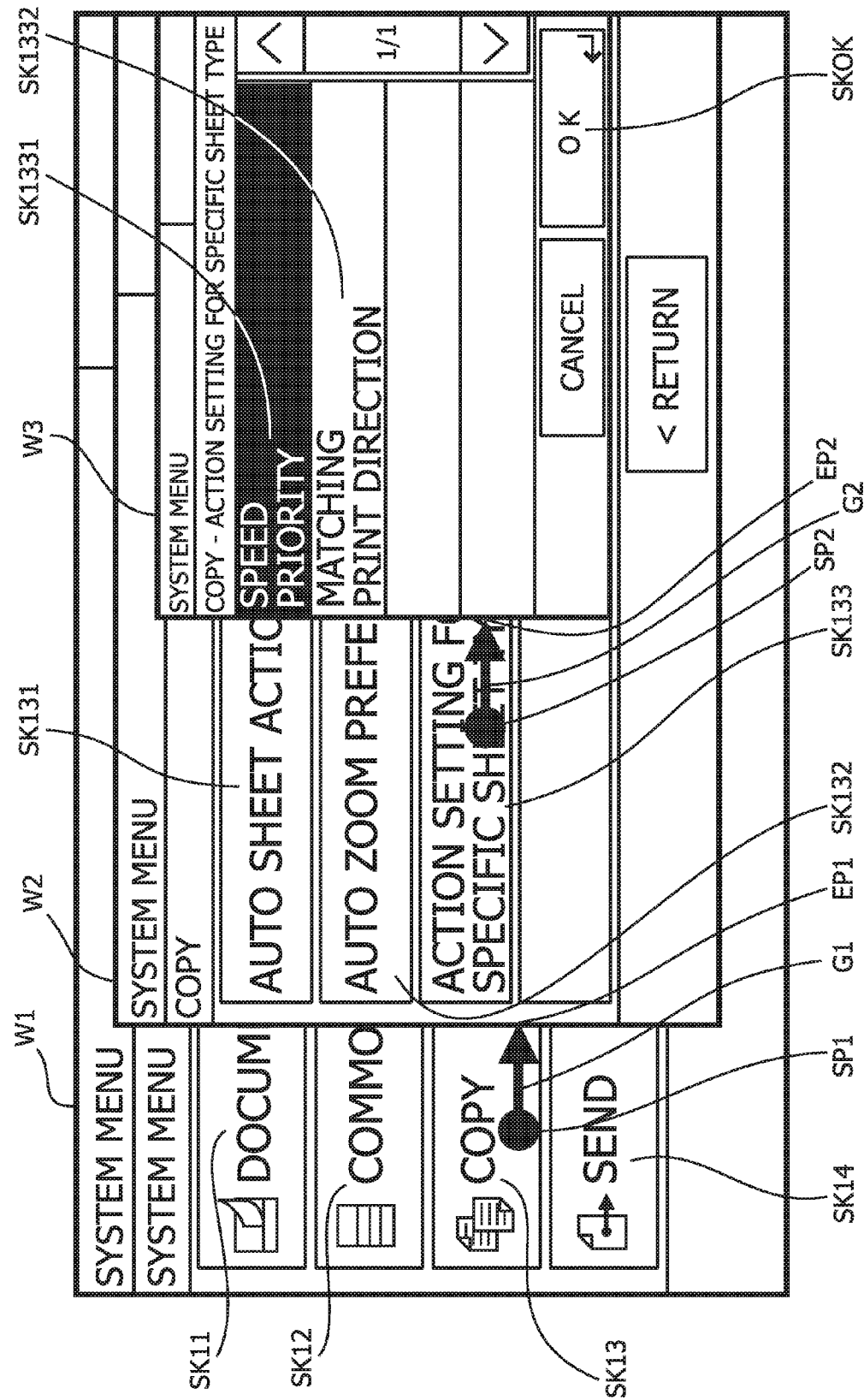

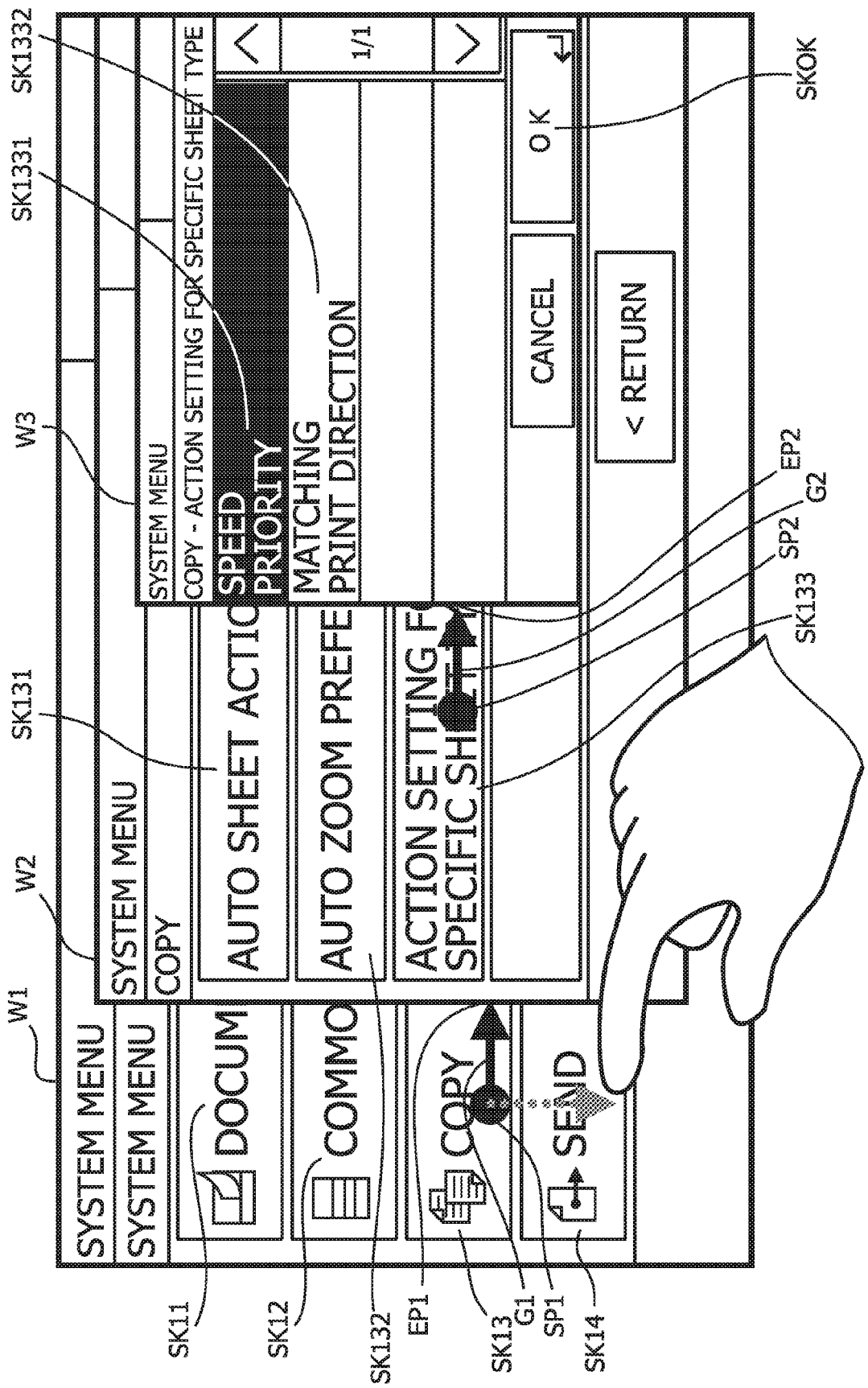

ELECTRONIC APPARATUS AND IMAGE FORMING APPARATUS WITH IMPROVED DISPLAYS OF DIFFERENT LEVELS OF MENU ITEMS

CROSS-REFERENCE TO RELATED APPLICATIONS

This application relates to and claims priority rights from Japanese Patent Applications: No. 2012-122874, filed on May 30, 2012, and No. 2013-008089, filed on Jan. 21, 2013, the entire disclosures of which are hereby incorporated by reference herein.

BACKGROUND

1. Field of the Invention

The present disclosure relates to an electronic apparatus and an image forming apparatus.

2. Description of the Related Art

For a setting operation to cause an electronic apparatus to perform a function, for example, a known conventional technique displays a window in which a selectable item to be a setting value of the function is displayed so as to enable a user to select the selectable item for the easy setting operation. Further, another technique displays plural windows corresponding to respective layers of functions, and enables a user to perform setting operations along the order of them.

However, when the aforementioned techniques are used for a setting of a function in a deep layer, the deeper the layer is the more windows a user must operate, and therefore, the heavier burden is given to a user. Further, to redo a setting operation for a function in an upper layer, a user must perform the following operations. The user closes all windows corresponding to functions in layers lower than the upper layer, and redoes the setting operation and then redoes setting operations layer by layer in turn until a window in a layer of a user's objective function is displayed.

To reduce such a user's burden, for example, a technique groups plural working windows displayed on a screen, and closes the grouped working windows at once.

Although the aforementioned technique reduces the user's burden to close windows corresponding to functions in layers lower than the upper layer, the user must still redo setting operations from the upper layer to lower layers layer by layer.

SUMMARY

An electronic apparatus according to an aspect of the present disclosure includes a display unit, a memory unit configured to store relation information to relate selectable items to be selected by a user in a layered tree structure, and a display control unit configured to perform a first step and a second step. The first step causes the display unit to display a first window in which plural selectable items in a layer is displayed so as to enable a user to select. The second step causes the display unit to display a second window in which selectable items are displayed so as to enable a user to select while the plural selectable items are displayed so as to enable a user to select in the first window, if one of the plural selectable items is selected in the first window; and the selectable items displayed in the second window are related with the selected selectable item and are located in a layer lower than the layer of the selected selectable item by one layer in the relation information.

Further, an image forming apparatus according to an aspect of the present disclosure includes the aforementioned electronic apparatus; and an image forming apparatus configured to form an image on a paper sheet. The plural selectable items include an item to be selected by a user to cause the image forming unit to form an image on a sheet.

These and other objects, features and advantages of the present invention will become more apparent upon reading of the following detailed description along with the accompanied drawings.

BRIEF DESCRIPTION OF THE DRAWINGS

FIGS. 8A and 8B show explanatory diagrams which indicate an example of an action of a third step in an embodiment of the present disclosure;

FIGS. 9A and 9B show explanatory diagrams which indicate an example of an action of a fourth step in an embodiment of the present disclosure;

FIGS. 10A and 10B show explanatory diagrams which indicate an example of an action of a fifth step in an embodiment of the present disclosure; and FIGS. 11A and 11B show explanatory diagrams which indicate an example of an action of a sixth step in an embodiment of the present disclosure.

DETAILED DESCRIPTION

Figure 1:
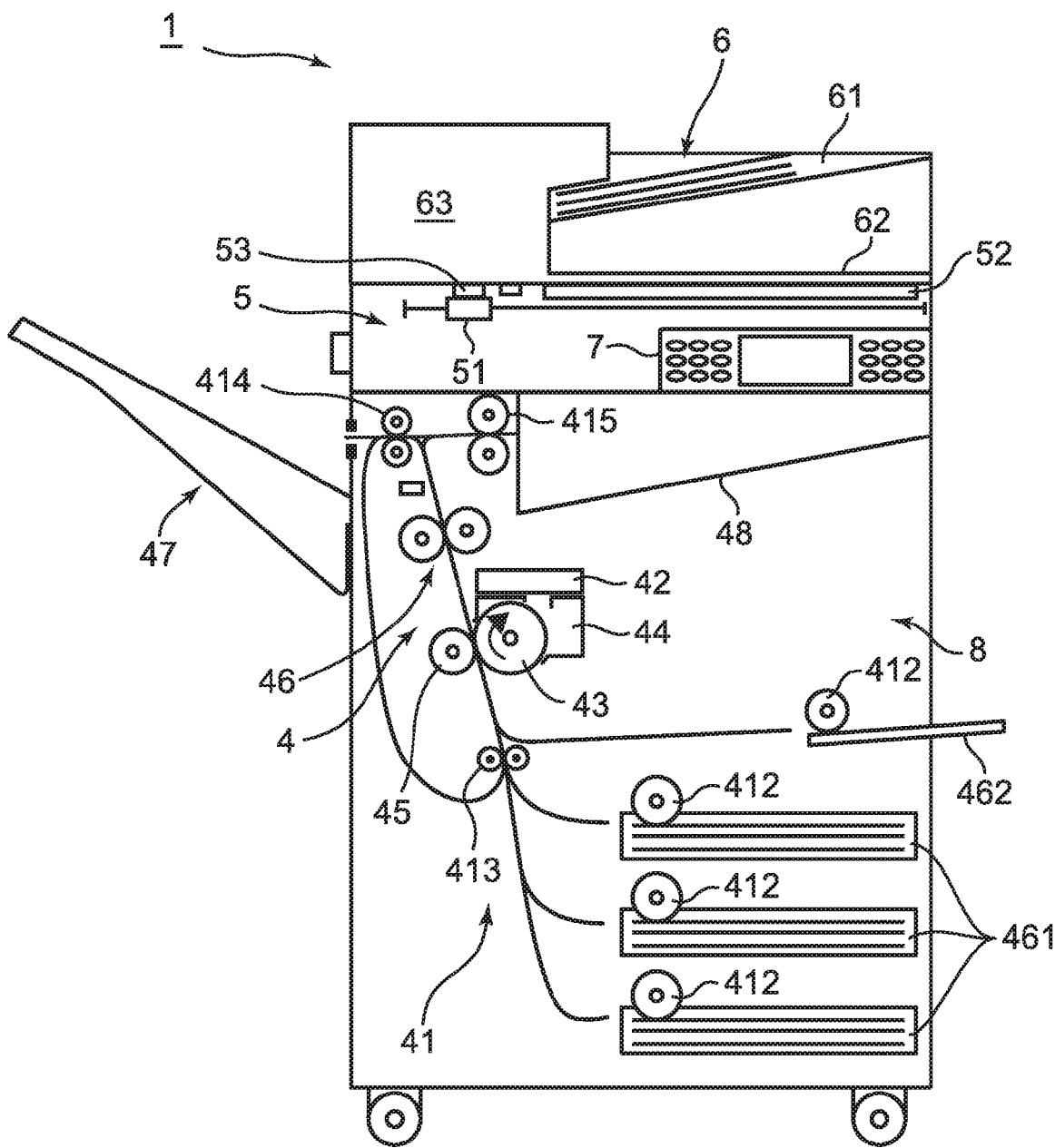
FIG. 1 shows a schematic structure diagram of a multifunction peripheral as an example of an image forming apparatus according to an embodiment of the present disclosure.

Hereinafter, referencing to drawings, an embodiment of the present disclosure is explained. FIG. 1 shows a schematic structure diagram of a multifunction peripheral 1 as an example of an image forming apparatus according to an embodiment of the present disclosure.

As shown in FIG. 1, the multifunction peripheral 1 includes a document reader unit 5, a document feeder unit 6, a main body unit 8, and an operation unit 7.

The document reader unit 5 is arranged on the main body unit 8. The document reader unit 5 includes a scanner unit 51 which consists of an exposure lamp, a CCD (Charge Coupled Device), and other elements, and a platen glass 52 and a document reading slit part 53 configured of transparent members such as glass.

The scanner unit 51 is configured to be capable of moving by a not-shown driving unit. When reading a document put on the platen glass 52, the scanner unit 51 moves along a surface of the document beneath the platen glass 52, obtains image data while scanning an image of the document, and outputs the image data to a control unit 10 mentioned below. When reading a document fed by the document feeder unit 6, the scanner unit 51 moves to beneath the document reading slit part 53, obtains image through the document reading slit part 53 while synchronizing with a transport action of the document, and outputs its image data to a control unit 10 mentioned below.

The document feeder unit 6 is arranged above the document reader unit 5. The document feeder unit 6 includes a document tray unit 61 on which a document is put, a document output part 62 to which a document is outputted after an image of the document has been read, and a document transport mechanism 63 which feeds a document put on the document tray unit 61 sheet by sheet onto the document reading slit part 53 and outputs the document to the document output unit 62.

The main body unit 8 includes plural paper cassettes 461; a paper feeding roller 412 which feeds a paper sheet from either the paper cassettes 461 or a manual paper tray 462, and transports the sheet to an image forming unit 4; the image forming unit 4 which forms an image on the transported paper sheet; and a stack tray 47 and an output tray 48 to which a paper sheet on which an image has been formed is outputted.

The image forming unit 4 includes a sheet transporting unit 41, a light scanning device 42, a photo conductor drum 43, a developing unit 44, a transferring unit 45, and a fuser unit 46.

The sheet transporting unit 41 is arranged on a sheet transport path in the image forming unit 4; and includes a transporting roller 413 which provides a paper sheet transported by the paper feeding roller 412 to the photo conductor drum 43, a transporting roller 414 which transports a paper sheet to the stack tray 47, a transporting roller 415 which transports a paper sheet to the output tray 48, and so forth.

The light scanning device 42 outputs laser light based on image data inputted to the control unit 10. The light scanning device 42 scans the laser light on the photo conductor drum 43 to form an electrostatic latent image on the photo conductor drum 43.

The developing unit 44 forms a toner image by attaching toner to an electrostatic latent image on the photo conductor drum 43. The transferring unit 45 transfers a toner image on the photo conductor drum 43 onto a paper sheet. The fuser unit 46 fixes a toner image on a paper sheet by heating the paper sheet on which the toner image has been transferred.

Figure 2:
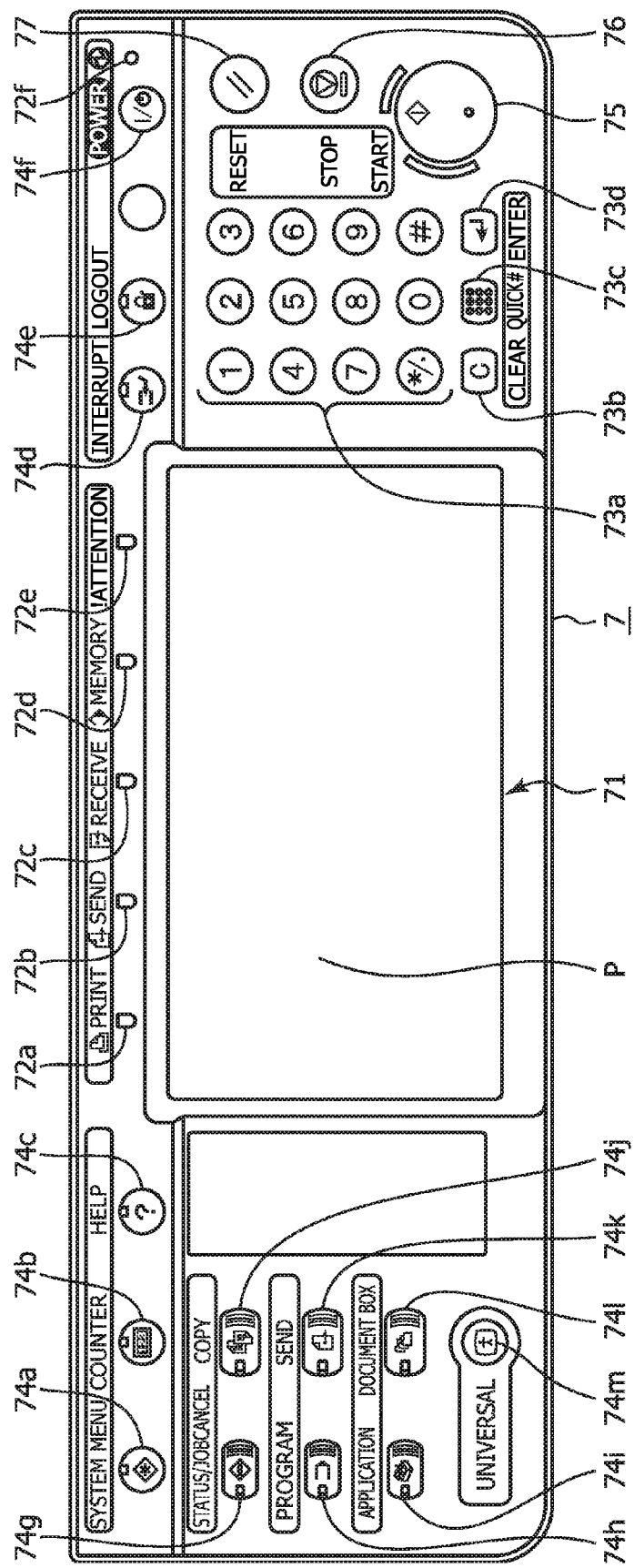
FIG. 2 shows an explanatory diagram which indicates an example of an operation unit according to an embodiment of the present disclosure.

The operation unit 7 is arranged on the front surface and configured to enable a user to input sorts of operations and instructions. FIG. 2 shows an explanatory diagram which indicates an example of the operation unit 7. As shown in FIG. 2, the operating unit 7 is equipped with a touch panel device 71, indicators 72a to 72f, input keys 73a to 73d, switches 74a to 74m, a start key 75, a stop key 76, and a reset key 77.

The touch panel device (display unit) 71 includes a liquid crystal display P having a touch panel function. Using the touch panel function, the touch panel device 71 receives a pressing down operation to a soft key when a user touches the soft key displayed by the liquid crystal display P for inputting an instruction. Further, using the touch panel function, the touch panel device 71 receives a trace of a position touched by a user on the liquid crystal display P, namely a gesture operation. On the basis of information on the trace received by the touch panel device 71, the control unit 10 mentioned below receives an instruction by means of the gesture operation.

For example, the touch panel device 71 receives sorts of gesture operations such as a tap operation, a pinch operation, a swipe operation, and a flick operation. The tap operation is to tap the liquid crystal display P. The pinch operation is either to touch and pinch a surface of the liquid crystal display P with two fingers or to spread the two fingers touching and pinching the surface. The swipe operation is to slide a finger while the finger touches a surface of the liquid crystal display P. The flick operation is to move a finger like sweeping a surface of the liquid crystal display P.

The indicators 72a to 72f include light emitting diodes or the like, and blink or turn on/off to indicate a status of the multifunction peripheral 1. For example, the indicator 72a blinks when printing, the indicator 72b blinks when transmitting data to the outside, and the indicator 72c blinks when receiving data from the outside. The indicator 72d blinks when accessing data stored in a hard disk drive, a memory and so forth arranged in the multifunction peripheral 1. The indicator 72e turns on or blinks when a trouble arises. The indicator 72f turns on when the multifunction peripheral 1 is in the power-on status.

The input keys 73a to 73d are installed for a user to input a number or a symbol and cancel or confirm an inputted character string. For example, the input keys 73a are so-called numeric keys installed to input a number and a symbol. The input key 73b is a so-called clear key installed to cancel an inputted character string.

The input key 73c is a so-called quick number key installed to invoke a character string which has been stored in a memory or the like in advance and input the invoked character string. The input key 73d is a so-called enter key (return key) installed to confirm an instruction such as an input instruction of a character string or a selection instruction of a soft key.

The switches 74a to 74m are switches to switch a function in use in the multifunction peripheral 1. For example, as mainly used one, the switch 74a is a switch of a system menu function for inputting an initial setting generally related to actions of the multifunction peripheral 1, and is operated to display a window on the liquid crystal display P to cause a user to perform a setting operation of the initial setting. Hereinafter, the switch 74a is called as the system menu button 74a.

The switch 74j is a switch of a copy function for causing the image forming unit 4 to form an image based on image data obtained by the scanner unit 51 on a paper sheet, and is operated to display a window on the liquid crystal display P to cause a user to perform a setting operation of the copy function. The switch 74k is a switch of a send function for sending image data obtained by the scanner unit 51 to the outside through a communicating unit 9 mentioned below, and is operated to display a window on the liquid crystal display P to cause a user to perform a setting operation of the send function.

The start key 75 is installed to start an action of a function. The stop key 76 is installed to stop an action of a function. The reset key 77 is installed to reset a setting value of a function to an initial status.

Figure 3:
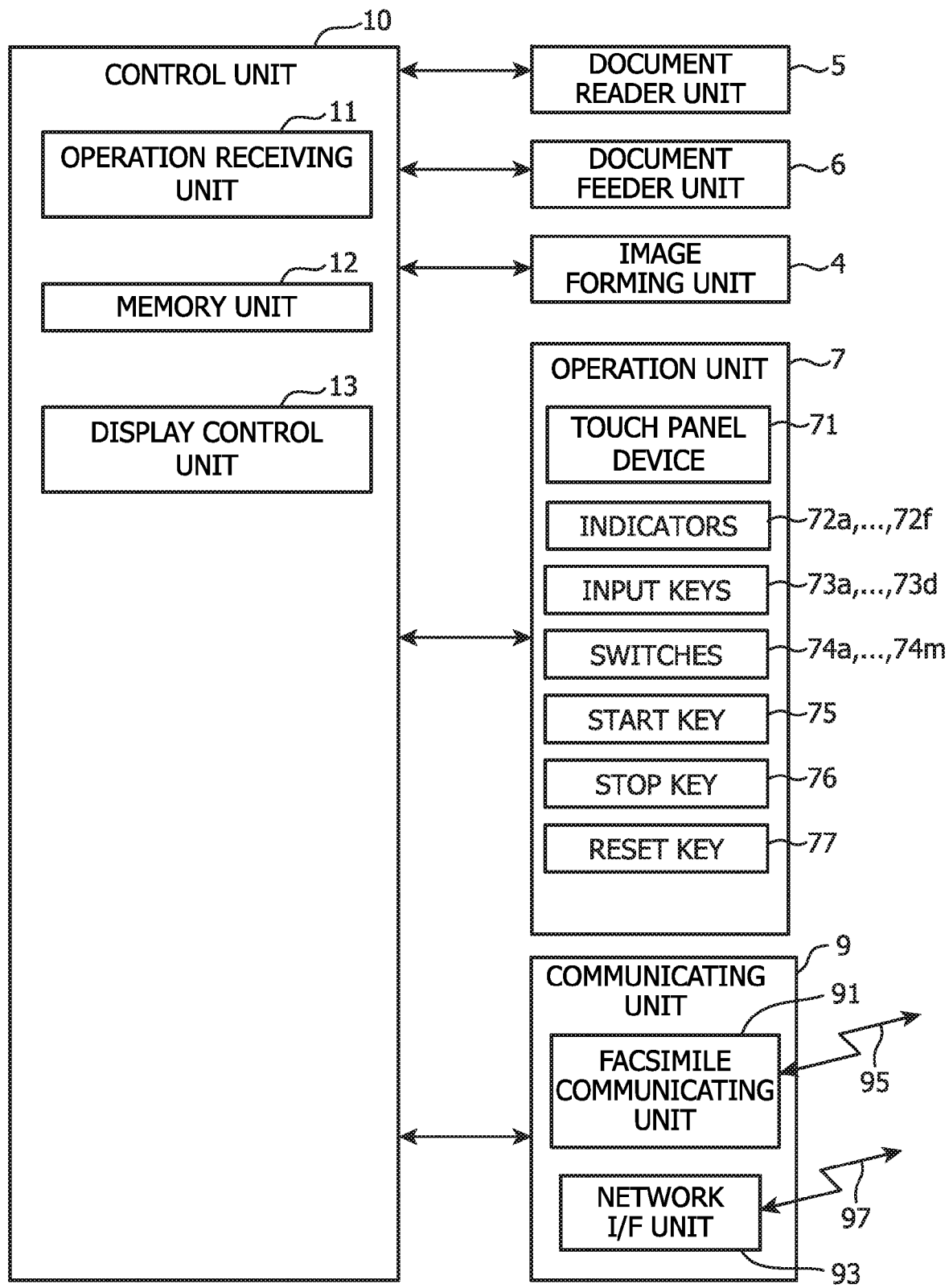
FIG. 3 shows a block diagram which indicates an electronic configuration of a multifunction peripheral according to an embodiment of the present disclosure.

FIG. 3 shows a block diagram which indicates an electronic configuration of the multifunction peripheral 1. The multifunction peripheral 1 connects internal units such as the aforementioned document reader 5, the aforementioned document feeder unit 6, the aforementioned image forming unit 4, the aforementioned operation unit 7, the communicating unit 9, and the control unit 10 to each other so as to enable the units to communicate with each other. Hereinafter, unless especially described, explanation is omitted on a part with a reference letter or numeral in FIG. 3 as same as a reference letter or numeral in FIG. 1 and FIG. 2.

The communicating unit 9 includes a facsimile communicating unit 91 and a network interface unit 93. The facsimile communicating unit 91 is connected to a telephone line 95.

The facsimile communicating unit 91 includes an NCU (Network Control Unit) which controls a connection of a telephone line to the other party, and a modem circuit which performs modulation and demodulation for a facsimile communication signal. The facsimile communicating unit 91 sends image data obtained by the document reader 5 to another facsimile machine through the telephone line 95, and receives image data sent from another facsimile machine.

The network interface unit 93 is connected to a LAN (Local Area Network) 97. The network interface unit 93 is a communication interface circuit to perform communication with a terminal device such as a personal computer connected to the LAN 97. The network interface unit 93 sends image data obtained by the document reader 5 through the LAN 97 to an external computer such as a personal computer, and receives image data sent from an external computer.

The control unit 10 includes, for example, a CPU (Central Processing Unit) which executes predetermined arithmetic processing; memories such as a ROM (Read Only Memory) which has stored a predetermined control program and a RAM (Random Access Memory) which temporarily stores data; a storage medium such as an HDD (Hard Disk Drive) which stores sorts of data such as image data; an ASIC (Application Specific Integrated Circuit) as specific hardware configured to perform a predetermined process such as image processing at a high speed, peripheral circuits therefor, and so forth. The control unit 10 performs sorts of processes by executing a control program stored in the ROM and so forth with the CPU and controls actions on the units and the devices in the multifunction peripheral 1.

For a control to cause a user to perform a setting operation, the control unit 10 acts as an operation receiving unit 11, a memory unit 12, and a display control unit 13.

The operation receiving unit 11 receives input of sorts of user operations and user instructions to the operation unit 7, such as a pressing-down operation to the switches 74a to 74m and a gesture operation inputted with a touch panel function of the touch panel device 71.

The memory unit 12 is configured, for example, with a ROM, and has stored relation information to relate plural selectable items to be selected by a user in a layered tree structure. Each of the selectable items is displayed as a soft key to be selected by a user when the user is caused to perform a setting operation.

Figure 4:
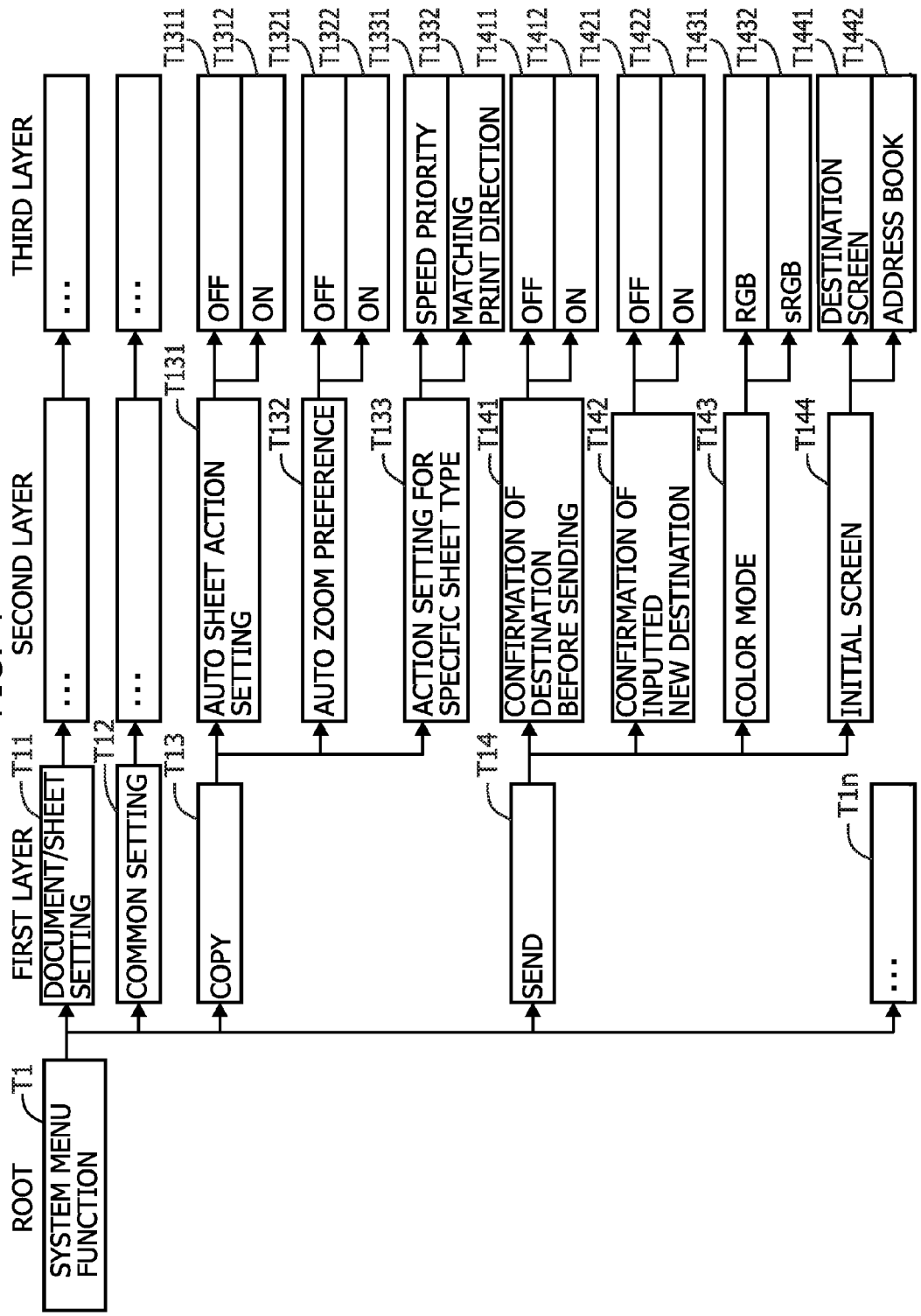
FIG. 4 shows an explanatory diagram which indicates an example of relation information stored in a memory unit in an embodiment of the present disclosure.

FIG. 4 shows an explanatory diagram which indicates an example of relation information stored in the memory unit 12. For example, as shown in FIG. 4, relation information stored in the memory unit 12 relates plural selectable items of a system menu function in a layered tree structure.

Specifically, information T1 which indicates the system menu function is stored as a root. In a first layer lower than the root by one layer, n selectable items T11 to T1*n* are stored such as the selectable item T11 to be selected with a setting operation for a document/sheet setting function, the selectable item T12 to be selected with a setting operation for a common setting function, the selectable item T13 to be selected with a setting operation for a copy function, and the selectable item T14 to be selected with a setting operation for a send function.

Further, in a second layer lower than the first layer of the selectable item T13 of the copy function by one layer, three selectable items T131 to T133 to be selected with a setting operation for detailed functions in the copy function are stored and related with the selectable item T13. The selectable item T131 is a selectable item to be selected with a setting operation for an auto sheet action setting function. The selectable item T132 is a selectable item to be selected with a setting operation for an auto zoom preference function. The selectable item T133 is a selectable item to be selected with a setting operation for an action setting function for a specific sheet type.

Furthermore, in a third layer lower than the second layer of the selectable item T131 of the auto sheet action setting function by one layer, a selectable item T1311 corresponding to an alternative "off" and a selectable item T1312 corresponding to an alternative "on" to be selected as the alternatives for a setting of the auto sheet action setting function are stored and related with the selectable item T131.

In the same manner, in the layer lower than the layer of the selectable item T132 of the auto zoom preference function by one layer, a selectable item T1321 corresponding to an alternative "off" and a selectable item T1322 corresponding to an alternative "on" to be selected as the alternatives for a setting of the auto zoom preference function are stored and related with the selectable item T132. Further, in the layer lower than the layer of the selectable item T133 of the action setting function for a specific sheet type by one layer, a selectable item T1331 corresponding to an alternative "speed priority" and a selectable item T1332 corresponding to an alternative "matching print direction" to be selected as the alternatives for a setting of the action setting function for a specific sheet type are stored and related with the selectable item T133.

In the same manner, in the layer lower than the layer of the selectable item T14 of the send function by one layer, four selectable items T141 to T144 to be selected with a setting operation for detailed functions in the send function are stored and related with the selectable item T14. The selectable item T141 is a selectable item to be selected with a setting operation for a function of confirmation of a destination before sending. The selectable item T142 is a selectable item to be selected with a setting operation for a function of confirmation of an inputted new destination. The selectable item T143 is a selectable item to be selected with a setting operation for a color mode function. The selectable item T144 is a selectable item to be selected with a setting operation for an initial screen function.

Further, in the layer lower than the layer of the selectable item T141 of the function of confirmation of a destination before sending by one layer, a selectable item T1411 corresponding to an alternative "off" and a selectable item T1412 corresponding to an alternative "on" to be selected as the alternatives for a setting of the function of confirmation of a destination before sending are stored and related with the selectable item T141. Furthermore, in the layer lower than the layer of the selectable item T142 of the function of confirmation of an inputted new destination by one layer, a selectable item T1421 corresponding to an alternative "off" and a selectable item T1422 corresponding to an alternative "on" to be selected as the alternatives for a setting of the function of confirmation of an inputted new destination are stored and related with the selectable item T142. Furthermore, in the layer lower than the layer of the selectable item T143 of the color mode function by one layer, a selectable item T1431 corresponding to an alternative "RGB" and a selectable item T1432 corresponding to an alternative "sRGB" to be selected as the alternatives for a setting of the color mode function are stored and related with the selectable item T143.

Furthermore, in the layer lower than the layer of the selectable item T144 of the initial screen function by one layer, a selectable item T1441 corresponding to an alternative "destination screen" and a selectable item T1442 corresponding to an alternative "address book" to be selected as the alternatives for a setting of the initial screen function are stored and related with the selectable item T144.

Return to FIG. 3, the display control unit 13 performs control to cause the liquid crystal display P to display a window in which selectable items are displayed on the basis of the relation information stored in the memory unit 12 in order to cause a user to perform sorts of setting operations.

Figure 5:
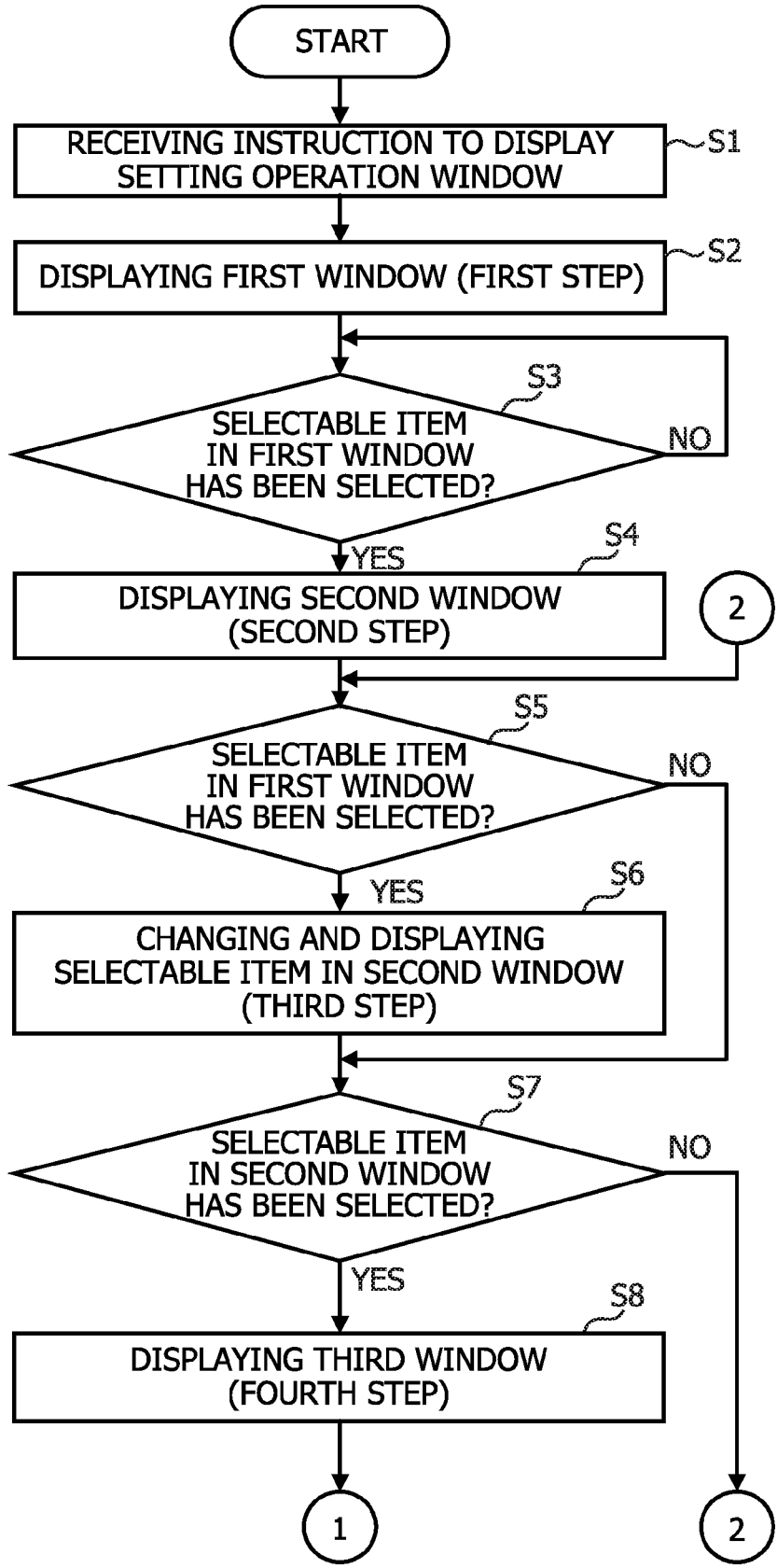
FIG. 5 shows a flowchart which indicates an example of the first half of actions to cause a user to perform an operation for selecting a selectable item in an embodiment of the present disclosure.
Figure 6:
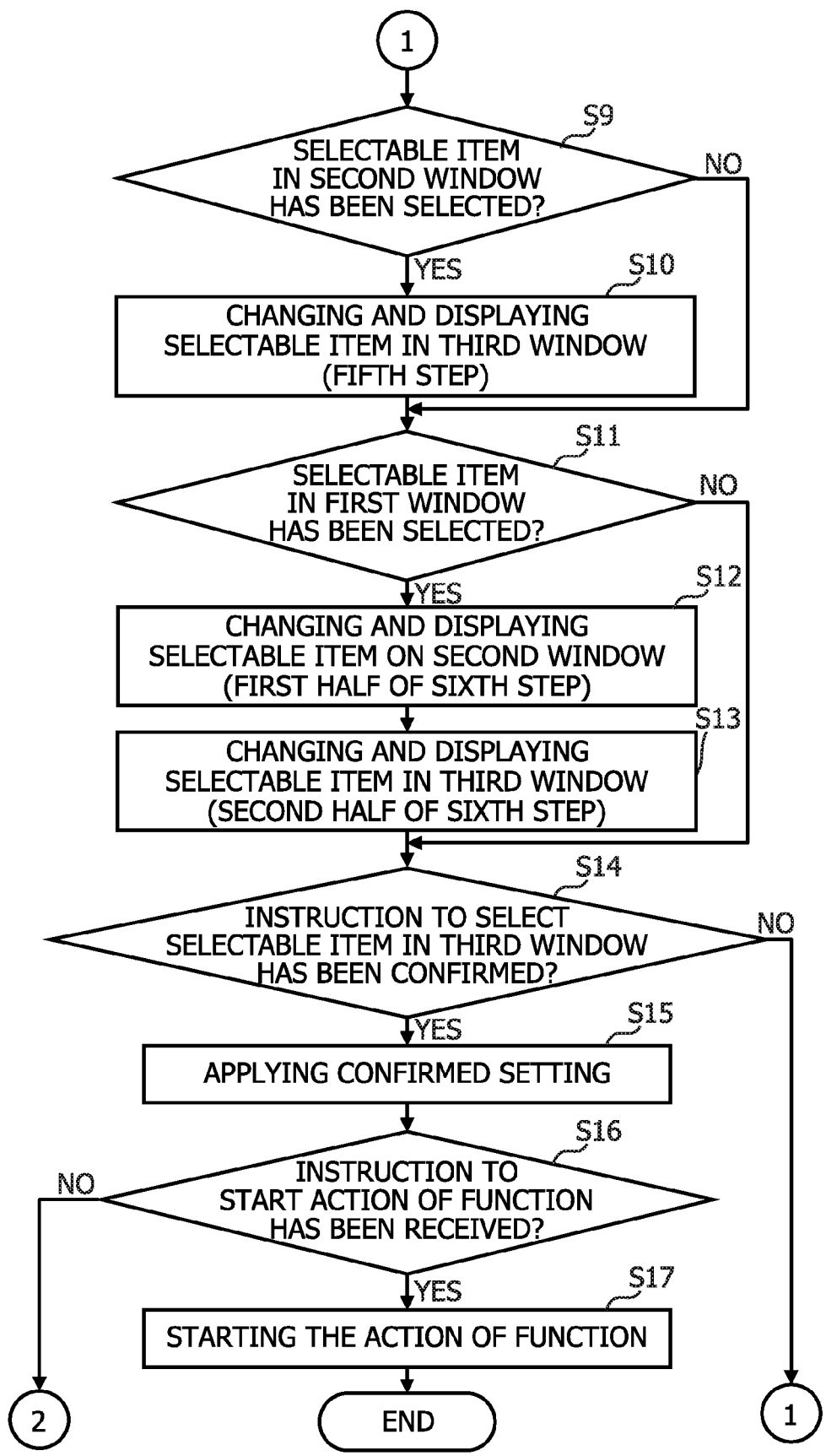
FIG. 6 shows a flowchart which indicates an example of the second half of actions to cause a user to perform an operation for selecting a selectable item in an embodiment of the present disclosure.

In the following part, referencing to FIG. 5 and FIG. 6, actions to cause a user to select the selectable item are explained, and referencing to FIG. 4 and FIGS. 7A to 11B, display control of the window performed by the display control unit 13 in these actions is explained. FIG. 5 shows a flowchart which indicates an example of the first half of actions to cause a user to perform an operation for selecting a selectable item. FIG. 6 shows a flowchart which indicates an example of the second half of actions to cause a user to perform an operation for selecting a selectable item.

For example, as shown in FIG. 5, if a user performs a pressing-down operation to the system menu button 74a to start an action of the system menu function, then on the basis of the pressing-down operation, the operation receiving unit 11 receives an instruction for displaying a window to enable to perform a setting operation of the system menu function (Step S1).

Figure 7A:
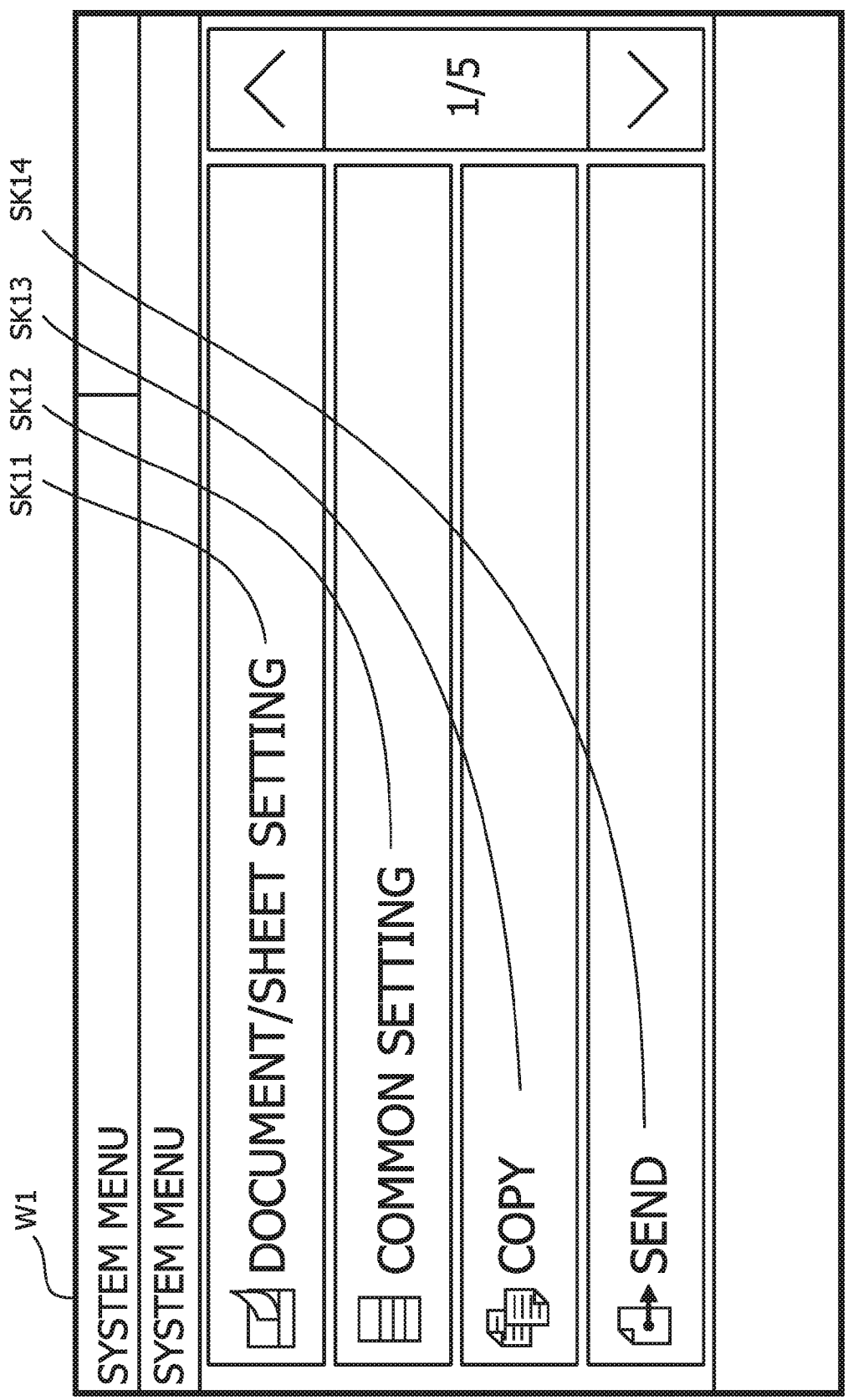
FIGS. 7A and 7B show explanatory diagrams which indicate an example of actions of a first step and a second step in an embodiment of the present disclosure.
Figure 7B:
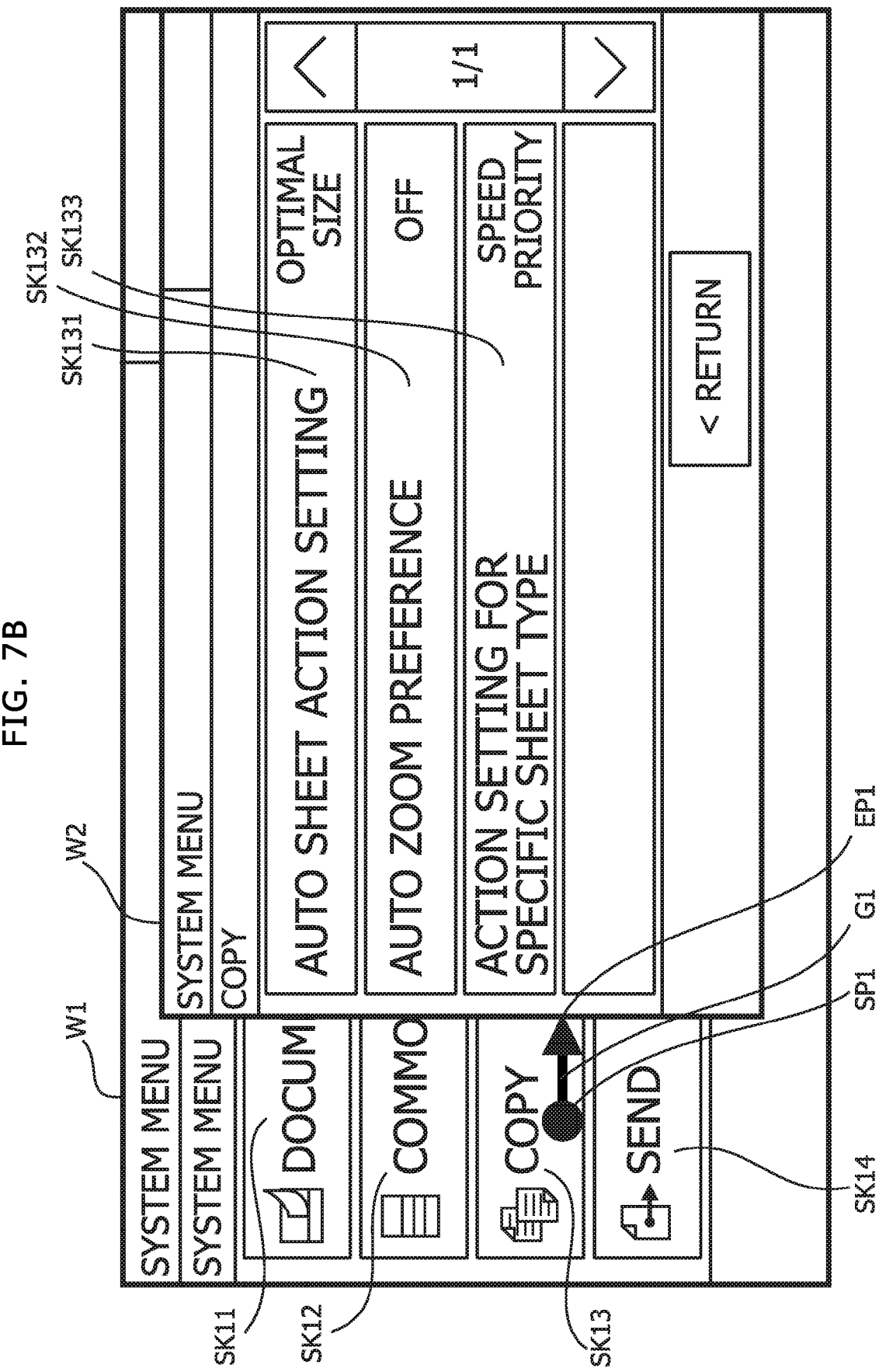

FIGS. 7A and 7B show explanatory diagrams which indicate an example of actions of Step 2 (a first step) and Step S4 (a second step). In Step S1, upon receiving the instruction for displaying a window to enable to perform a setting operation of the system menu function, the display control unit 13 obtains the relation information which includes the information T1 indicating the system menu function as a root from the memory unit 12. On the basis of the aforementioned relation information, as shown in FIG. 7A, the display control unit 13 causes the touch panel device 71 to display a first window W1 on the liquid crystal display P (Step S2, the first step). In the first window W1, soft keys SK11 to SK14 are displayed so as to enable to perform a touch operation to them, and correspond to respective the four selectable items T11 to T14 that are related with the information T1 indicating the system menu function and are located in the layer lower than the information T1 by one layer. For simplicity of explanation, causing the touch panel device 71 to display a window and so forth on the liquid crystal display P is described as displaying a window and so forth, hereinafter.

As mentioned, the first window W1 is configured to be capable of displaying only four soft keys at the same time. The first window W1 is configured to be capable of displaying a soft key of another selectable item which is not currently displayed through scrolling, for example, if a user performs a swipe operation in the vertical direction of the liquid crystal display P while the user is touching any of the four soft keys displayed in the first window W1.

Return to FIG. 5, for example, if a touch operation is performed to the soft key SK13 of the copy function as one of the soft keys SK11 to SK14 displayed in the first window W1, the display control unit 13 determines that a user selected the selectable item T13 corresponding to the soft key SK13 to which the touch operation was performed (YES at Step S3).

On the basis of the aforementioned relation information, as shown in FIG. 7B, the display control unit 13 displays a second window W2 while displaying all of the soft keys SK11 to SK14 in the first window W1 so as to enable a user to perform a touch operation to them (Step S4, the second step). In the second window W2, soft keys SK131 to SK133 are displayed so as to enable to perform a touch operation to them, and correspond to the respective selectable items T131 to T133 that are related with the selected selectable item T13 and are located in the layer lower than the selected selectable item T13 by one layer.

In addition, in Step S4, the display control unit 13 displays a line image G1 from a first starting position SP1 to a first end position EP1. The first starting position SP1 is a position in a display area of the soft key SK13 to which a touch operation was performed among the soft keys SK11 to SK14 displayed in the first window W1. The first end position EP1 is a position on an outer edge of the second window W2.

As well as the first window W1, the second window W2 is configured to be capable of displaying four soft keys at the same time, and is configured to be capable of displaying another soft key which is not currently displayed through scrolling.

Further, for example, as shown in FIG. 7B, the display control unit 13 displays information which indicates setting values of a function corresponding to the respective soft keys SK131 to SK133 on the soft keys SK131 to SK133 (e.g. "optimal size" on the soft key SK131 of "auto sheet action setting").

The information which indicates setting values of a function corresponds to any of selectable items selected as alternatives specifying setting values, and is stored so as to relate with information on the function in a ROM. As mentioned below, when a user confirms a setting value of a function by selecting a selectable item, since a combination of the confirmed setting value and the function is stored in a RAM, the display control unit 13 displays information on the setting value stored in the RAM rather than information on a default setting value stored in the ROM.

Figure 8B:
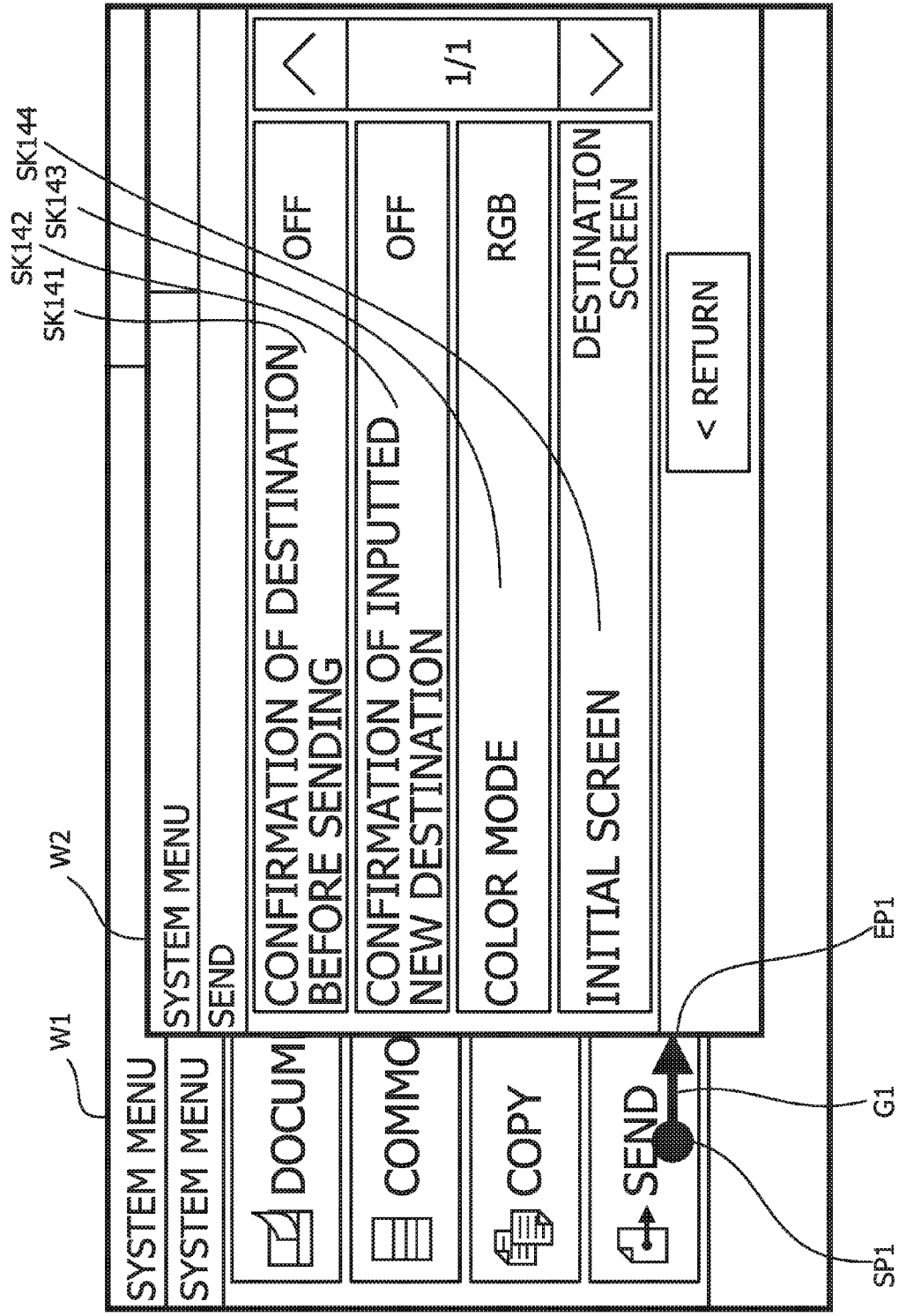

FIGS. 8A and 8B show explanatory diagrams which indicate an example of an action of Step S6 (a third step). For example, as shown in FIG. 8A, while the first window W1 and the second window W2 are displayed, if a touch operation is newly performed to the soft key SK14 of the send function among the soft keys SK11 to SK14 displayed in the first window W1, then the display control unit 13 determines that the selectable item T14 corresponding to the soft key SK14 was newly selected (YES at Step S5).

Upon determining it, on the basis of the relation information, as shown in FIG. 8B, for example, the display control unit 13 changes the soft keys SK131 to SK133 displayed in the second window W2 to soft keys SK141 to SK144 corresponding to the respective selectable items T141 to T144 that are related with the newly selected selectable item T14 and are located in a lower layer than a layer of the selectable item T14 by one layer, and displays the soft keys SK141 to SK144 (Step S6, the third step).

In addition, in Step S6, the display control unit 13 changes the starting position SP1 of the line image G1 to a position in a display area of the soft key SK14 to which a touch operation was performed in Step S5, changes the end position EP1 of the line image G1 to a position with the same height as the starting position SP1 of the line image G1 on an outer edge of the second window W2, and displays the changed line image G1. The change of the line image G1 is not limited to this manner, and the display control unit 13 may be configured to change only the starting position SP1 of the line image G1, namely, not to change the end position EP1 of the line image G1, and display the changed line image G1.

Further, in Step S6 as well as in Step S4, as shown in FIG. 8B, for example, information which indicates setting values of a function corresponding to the respective soft keys SK141 to SK144 is displayed on the soft keys SK141 to SK144 (e.g. "off" on the soft key SK141 of "confirmation of destination before sending").

Figure 9A:
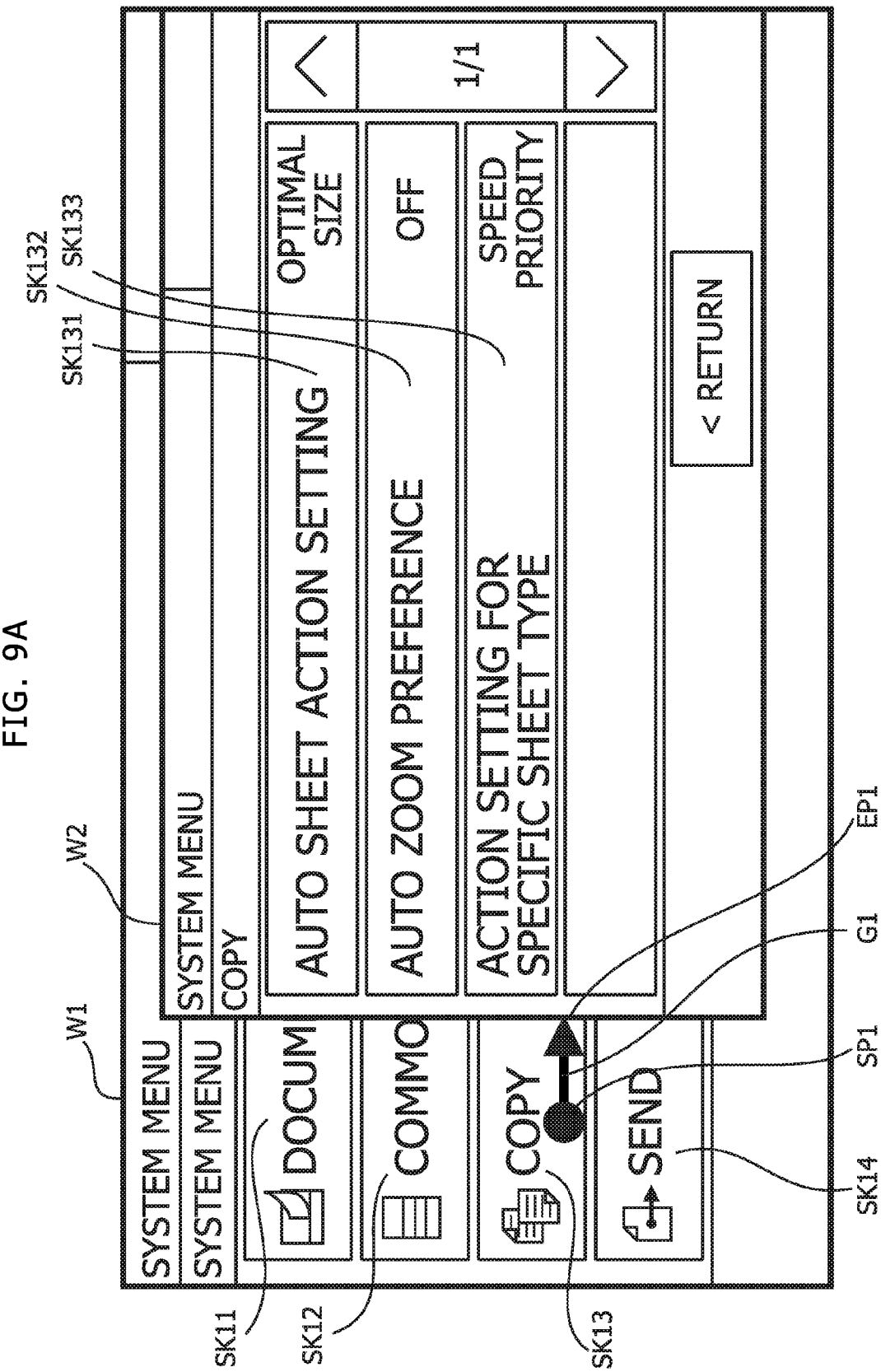

FIGS. 9A and 9B show explanatory diagrams which indicate an example of an action of Step S8 (a fourth step). For example, as shown in FIG. 9A, while the first window W1 and the second window W2 are displayed, if a touch operation is performed to the soft key SK132 of the auto zoom preference function among the soft keys SK131 to SK133 displayed in the second window W2, then the display control unit 13 determines that the selectable item T132 corresponding to the soft key SK132 was newly selected (YES at Step S7).

On the basis of the aforementioned relation information, as shown in FIG. 9B, the display control unit 13 displays a third window W3 while displaying all of the soft keys displayed in the first window W1 and the second window W2 so as to enable a user to perform a touch operation to them (Step S8, the fourth step). In the third window W3, soft keys SK1321 and SK1322 are displayed so as to enable to perform a touch operation to them, and correspond to the respective selectable items T1321 and T1322 that are related with the newly selected selectable item T132 and are located in the layer lower than the newly selected selectable item T132 by one layer.

In addition, in Step S8, the display control unit 13 displays a line image G2 from a second starting position SP2 to a second end position EP2. The second starting position SP2 is a position in a display area of the soft key SK132 to which a touch operation was performed among the soft keys SK131 to SK133 displayed in the second window W2. The second end position EP2 is a position on an outer edge of the third window W3.

Further, in Step S8, the display control unit 13 displays an OK button SKOK so as to enable a user to perform a touch operation to it in the third window W3. Detailed explanation is mentioned below in Step S15 for an action performed when the OK button SKOK is pressed down.

As well as the first window W1 and the second window W2, the third window W3 is configured to be capable of displaying four soft keys at the same time, and is configured to be capable of displaying another soft key which is not currently displayed through scrolling.

On the other hand, if a touch operation has not been performed to any of the soft keys displayed in the second window W2 (NO at Step S7), then return to Step S5.

Subsequently, referencing to FIG. 6, explained is an example of the second half of actions to cause a user to perform an operation for selecting a selectable item. FIGS. 10A and 10B show explanatory diagrams which indicate an example of an action of Step S10 (a fifth step). For example, as shown in FIG. 10A, while the first window W1, the second window W2 and the third window W3 are displayed, if a touch operation is newly performed to the soft key SK133 among the soft keys SK131 to SK133 displayed in the second window W2, then the display control unit 13 determines that the selectable item T133 corresponding to the soft key SK133 was newly selected (YES at Step S9).

Upon determining it, on the basis of the relation information, as shown in FIG. 10B, for example, the display control unit 13 changes the soft keys SK1321 and SK1322 displayed in the third window W3 to soft keys SK1331 and SK1332 corresponding to the respective selectable items T1331 and T1332 that are related with the newly selected selectable item T133 and are located in a lower layer than a layer of the selectable item T133 by one layer, and displays the soft keys SK1331 and SK1332 (Step S10, the fifth step).

In addition, in Step S10, the display control unit 13 changes the starting position SP2 of the line image G2 to a position in a display area of the soft key SK133 to which a touch operation was performed in Step S9, changes the end position EP2 of the line image G2 to a position with the same height as the starting position SP2 of the line image G2 on an outer edge of the third window W3, and displays the changed line image G2. The change of the line image G2 is not limited to this manner, and the display control unit 13 may be configured to change only the starting position SP2 of the line image G2, namely, not to change the end position EP2 of the line image G2, and display the changed line image G2.

Figure 11B:
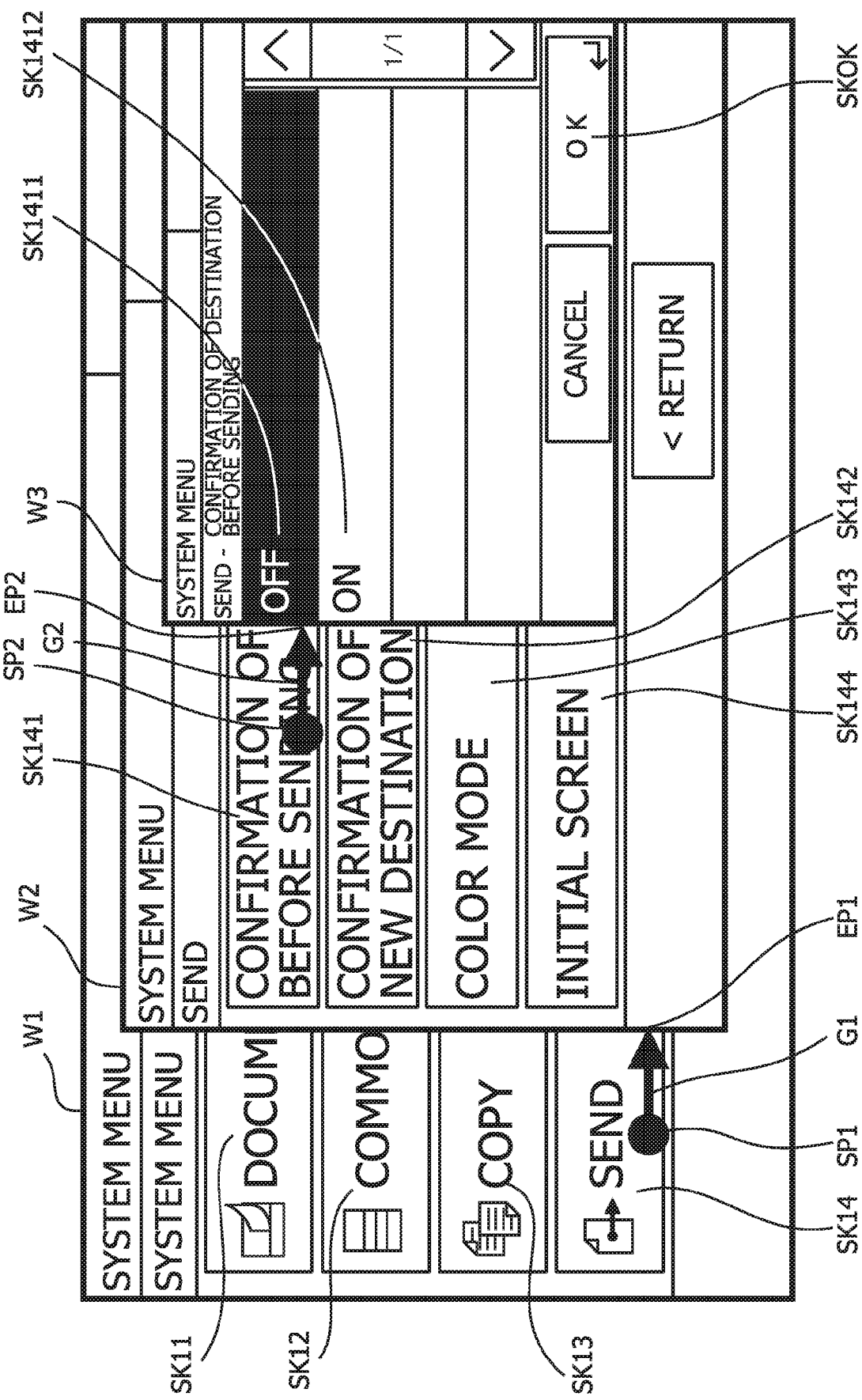

FIGS. 11A and 11B show explanatory diagrams which indicate an example of an action of Step S1, Step S12 and Step S13 (a sixth step). For example, as shown in FIG. 11A, while the first window W1, the second window W2 and the third window W3 are displayed, if a touch operation is newly performed to the soft key SK14 of the send function among the soft keys SK11 to SK14 displayed in the first window W1, then the display control unit 13 determines that the selectable item T14 corresponding to the soft key SK14 was newly selected (YES at Step S11).

Upon determining it, on the basis of the relation information, as shown in FIG. 11B, for example, the display control unit 13 changes the soft keys SK131 to SK133 displayed in the second window W2 to soft keys SK141 to SK144 corresponding to the respective selectable items T141 to T144 that are related with the newly selected selectable item T14 and are located in a lower layer than a layer of the selectable item T14 by one layer, and displays the soft keys SK141 to SK144 (Step S12, the first half of the sixth step).

After performing Step S12, the display control unit 13 considers that a touch operation was performed to a predetermined one, for example, the top soft key SK141 of the soft keys SK141 to SK144 displayed in the second window W2 after the change, and considers the selectable item T141 corresponding to this soft key SK141 as a selected selectable item. Subsequently, on the basis of the relation information, as shown in FIG. 11B, for example, the display control unit 13 changes the soft keys SK1331 and SK1332 displayed in the third window W3 to soft keys SK1411 and SK1412 corresponding to the respective selectable items T1411 and T1412 that are related with the selectable item T141 considered as a selected one and are located in a lower layer than a layer of the selectable item T141 by one layer, and displays the soft keys SK1411 and SK1412 (Step S13, the second half of the sixth step).

The selectable item considered as a selected one in Step S13 has been set in advance as any of selectable items that are related with a newly selected selectable item in Step S11 and are located in a layer lower than a layer of the newly selected selectable item by one layer, and has been stored in a ROM or the like. Therefore, the display control unit 13 is configured to consider that a touch operation was performed to a soft key corresponding to a selectable item which has been set and stored in the ROM or the like, and considers the selectable item which has been set as a selected selectable item.

In addition, in Step S12, the display control unit 13 changes the starting position SP1 of the line image G1 to a position in a display area of the soft key SK14 to which a touch operation was performed in Step S11, changes the end position EP1 of the line image G1 to a position with the same height as the starting position SP1 of the line image G1 on an outer edge of the second window W2, and displays the changed line image G1. The change of the line image G1 is not limited to this manner, and the display control unit 13 may be configured to change only the starting position SP1 of the line image G1, namely, not to change the end position EP1 of the line image G1, and display the changed line image G1.

In addition, in Step S13, the display control unit 13 changes the starting position SP2 of the line image G2 to a position in a display area of the soft key SK141 considered as one to which a touch operation was performed in Step S13, changes the end position EP2 of the line image G2 to a position with the same height as the starting position SP2 of the line image G2 on an outer edge of the third window W3, and displays the changed line image G2. The change of the line image G2 is not limited to this manner, and the display control unit 13 may be configured to change only the starting position SP2 of the line image G2, namely, not to change the end position EP2 of the line image G2, and display the changed line image G2.

If a touch operation is performed to the OK button SKOK under a status that a touch operation has been performed to any of soft keys displayed in the third window W3 (e.g. the soft key SK1321 in FIG. 9B), then the control unit 10 determines that a selection instruction was confirmed of a selectable item corresponding to the soft key to which the touch operation has been performed (YES at Step S14).

Subsequently, the control unit 10 finally sets a setting value of a function (e.g. "auto zoom preference" in FIG. 9A) corresponding to the selectable item in Step S7 or Step S9 as a setting value (e.g. "off" in FIG. 9B) of the function corresponding to the selectable item of which the selection instruction was confirmed, and stores a combination of information on this function and information on this setting value in the RAM (Step S15). On the other hand, if a touch operation has not been performed to the OK button SKOK (NO at Step S14), then return to Step S9.

Further, if the operation receiving unit 11 has not received a pressing down operation to the start key 75 (in FIG. 2) for inputting an instruction (NO at Step S16), then return to Step S5. On the other hand, if the operation receiving unit 11 receives a pressing down operation to the start key 75 (in FIG. 2) for inputting an instruction (YES at Step S16), then the control unit 10 starts actions of the function with the setting value stored in the RAM and so forth in Step S15 (Step S17).

In the configuration of the aforementioned embodiment, in Step S4 (the second step), selectable items that are related with a selectable item selected in the first window W1 and are located in a layer lower than a layer of the selectable item selected in the first window W1 are displayed in the second window W2 so as to enable a user to select them while selectable items are displayed in the first window W1 so as to enable a user to select them. A user can select a selectable item displayed in the first window W1 while the second window W2 is displayed. Therefore, when a user selects another selectable item displayed in the first window W1, the user is not required to close the second window W2, and consequently, convenience is enhanced when plural windows are displayed in respective layers to cause a user to perform setting operations along the order of them.

Further, in the configuration of the aforementioned embodiment, in Step S6 (the third step), if a newly selected selectable item in the first window W1 is selected while the second window W2 is displayed, then the selectable items displayed in the second window W2 are changed to selectable items related with the newly selected selectable item, and the changed selectable items are displayed in the second window W2. If a user newly selects another selectable item displayed in the first window W1, without closing the second window W2, the user can immediately select a selectable item related with the newly selected selectable item in the second window W2. Therefore, convenience is enhanced when plural windows are displayed in respective layers to cause a user to perform setting operations along the order of them.

Furthermore, in the configuration of the aforementioned embodiment, in Step S8 (the fourth step), selectable items that are related with a selectable item selected in the second window W2 and are located in a layer lower than a layer of the selectable item selected in the second window W2 are displayed in the third window W3 so as to enable a user to select them while selectable items are displayed in the first window W1 and the second window W2 so as to enable a user to select them. A user can select a selectable item displayed in the first window W1 and the second window W2 while the third window W3 is displayed. Therefore, when a user selects another selectable item displayed in the first window W1 or the second window W2, the user is not required to close the third window W3, and consequently, convenience is enhanced when plural windows are displayed in respective layers to cause a user to perform setting operations along the order of them.

Furthermore, in the configuration of the aforementioned embodiment, in Step S10 (the fifth step), if a newly selected selectable item in the second window W2 is selected while the third window W3 is displayed, the selectable items displayed in the third window W3 are changed to selectable items related with the newly selected selectable item. If a user newly selects another selectable item displayed in the second window W2, without closing the third window W3, the user can immediately select a selectable item related with the newly selected selectable item in the third window W3. Therefore, convenience is enhanced when plural windows are displayed in respective layers to cause a user to perform setting operations along the order of them.

Furthermore, in the configuration of the aforementioned embodiment, in Step S12 and Step S13 (the sixth step), if a newly selected selectable item in the first window W1 is selected while the first window W1, the second window W2 and the third window W3 are displayed, then the selectable items displayed in the second window W2 are changed to selectable items related with the newly selected selectable item. Subsequently, selectable items related with a predetermined one among selectable items displayed in the second window W2 are displayed in the third window W3. If a user newly selects another selectable item displayed in the first window W1, without closing the second window W2 and/or the third window W3, the user can immediately select a selectable item related with the newly selected selectable item in the second window W2 or the third window W3. Therefore, convenience is enhanced when plural windows are displayed in respective layers to cause a user to perform setting operations along the order of them.

Furthermore, in the configuration of the aforementioned embodiment, in Step S4 and Step S6, a relation between a selectable item selected in the first window W1 and the second window W2 is visualized with a line image. Therefore, a user can intuitively understand which one of selectable items displayed in the first window W1 is related with selectable items displayed in the second window W2.

For example, in the case that sets of selectable items that are related with respective plural selectable items corresponding to plural soft keys displayed in the first window W1 and are located in a layer lower than a layer of the selectable items of the first window W1 by one layer have respective sets of same setting values, the possibility is reduced that a user incorrectly determines which one of the selectable items displayed in the first window W1 is related with selectable items displayed in the second window W2. Therefore, the possibility is reduced that a user performs a touch operation to a wrong soft key displayed in the second window W2.

Furthermore, in the configuration of the aforementioned embodiment, in Step S8, Step S10, and Step S13, a relation between a selectable item for which a touch operation was performed in the second window W2 and the third window W3 is visualized with a line image. Therefore, a user can intuitively understand which one of selectable items displayed in the second window W2 is related with selectable items displayed in the third window W3.

For example, in the case that sets of selectable items that are related with respective plural selectable items corresponding to plural soft keys displayed in the second window W2 and are located in a layer lower than a layer of the selectable items of the second window W2 by one layer have respective sets of same setting values (e.g. "on" and "off"), the possibility is reduced that a user incorrectly determines which one of the selectable items displayed in the second window W2 is related with selectable items displayed in the third window W3. Therefore, the possibility is reduced that a user performs a touch operation to a wrong soft key displayed in the third window W3.

The description of the present invention has been presented for purposes of illustration and description, and is not intended to be exhaustive or limited to the invention in the form disclosed.

For example, as shown in FIG. 8A, the operation receiving unit 11 may be configured to receive a swipe operation to touch the starting position SP1 of the line image and move the touched position to a display area of one of soft keys displayed in the first window W1 (e.g. the soft key SK14). Further, the display control unit 13 may be configured to identify as the newly selected item a selectable item corresponding to a soft key displayed at an end position of the swipe operation (e.g. the selectable item T14) and perform Step S6 (the third step), if the operation receiving unit 11 receives the swipe operation.

In this configuration, with understanding a change of a relation between a selectable item selected in the first window W1 and the second window W2, a user can newly select another selectable item displayed in the first window W1 with the swipe operation while touching the starting position SP1 of the line image. Therefore, Step S6 (the third step) is subsequently performed, and consequently, the possibility is reduced that a user misunderstands a relation between the selectable item newly selected in the first window W1 and selectable items displayed in the second window W2.

In the same manner, for example, as shown in FIG. 10A, the operation receiving unit 11 may be configured to receive a swipe operation to touch the starting position SP2 of the line image and move the touched position to a display area of one of soft keys displayed in the second window W2 (e.g. the soft key SK133). In addition, it may be configured to identify as the newly selected item a selectable item corresponding to a soft key displayed at an end position of the swipe operation (e.g. the selectable item T133) and perform Step S10 (the fifth step), if the operation receiving unit 11 receives this swipe operation.

In this configuration, with understanding a change of a relation between a selectable item selected in the second window W2 and the third window W3, a user can newly select another selectable item displayed in the second window W2 with the swipe operation while touching the starting position SP2 of the line image. Therefore, Step S10 (the fifth step) is subsequently performed, and consequently, the possibility is reduced that a user misunderstands a relation between the selectable item newly selected in the second window W2 and selectable items displayed in the third window W3.

Further, for example, as shown in FIG. 11A, the operation receiving unit 11 may be configured to receive a swipe operation to touch the starting position SP1 of the line image and move the touched position to a display area of one of soft keys displayed in the first window W1 (e.g. the soft key SK14) while the first window W1, the second window W2, and the third window W3 are displayed. In addition, the display control unit 13 may be configured to identify as the newly selected item a selectable item corresponding to a soft key displayed at an end position of the swipe operation (e.g. the selectable item T14) and perform Step S13 (the six step), if the operation receiving unit 11 receives the swipe operation.

In this configuration, while the first window W1, the second window W2, and the third window W3 are displayed, with understanding a change of a relation between a selectable item selected in the first window W1 and the second window W2, a user can newly select another selectable item displayed in the first window W1 with the swipe operation while touching the starting position SP1 of the line image. Therefore, Step S12 and Step S13 (the sixth step) is subsequently performed, and consequently, the possibility is reduced that a user misunderstands a relation between the selectable item newly selected in the first window W1 and selectable items displayed in the second window W2 and the third window W3.

Furthermore, the display control unit 13 may be configured not to display the line image to the first end position EP1 on an outer edge of the second window W2 in Step S4 and Step S6.

Furthermore, the display control unit 13 may be configured not to display the line image to the second end position EP2 on an outer edge of the third window W3 in Step S8, Step S10, and Step S13.

Furthermore, the display control unit 13 may be configured not to perform Step S12 and Step S13 (the six step). Furthermore, the display control unit 13 may be configured not to perform Step S10 (the fifth step). Furthermore, the display control unit 13 may be configured not to perform Step S8 (the fourth step). Furthermore, the display control unit 13 may be configured not to perform Step S6 (the third step).

Furthermore, in the aforementioned embodiment, the multifunction peripheral 1 is explained as an example of an image forming apparatus according to the present invention. Alternatively, for example, an image forming apparatus according to the present invention may be applied to a facsimile machine, a printer machine, or a copy machine. Furthermore, in the aforementioned embodiment, an example is explained in which an electronic apparatus according to the present invention is applied to the touch panel device 7 and the control unit 10. Alternatively, for example, an electronic apparatus according to the present invention may be applied to a scanner machine, a game machine, a cellular phone, or a car navigation device.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An electronic apparatus, comprising:
   a display unit;
   a memory unit configured to store relation information to relate selectable items to be selected by a user in a layered tree structure; and
   a display control unit configured to perform a first step and a second step;
   wherein the first step causes the display unit to display a first window in which selectable items in a layer is displayed so as to enable the user to select one of the selectable items; and
   the second step is performed if one of the selectable items is selected in the first window;

wherein the second step causes the display unit to display a second window in which selectable items are displayed so as to enable the user to select one of the selectable items in the second window while the selectable items are displayed in the first window so as to enable the user to select one of the selectable items in the first window also; the selectable items displayed in the second window are related with the selected selectable item in the first window and are located in a layer lower than the layer of the selected selectable item in the first window by one layer in the relation information;

wherein the display control unit is further configured to perform a third step if one of the selectable items is selected in the second window; the third step causing the display unit to display a third window in which selectable items are displayed so as to enable the user to select one of the selectable items in the third window while the selectable items are displayed in the first and second windows so as to enable the user to select one of the selectable items in the first window and the second window also;

the selectable items displayed in the third window are related with the selected selectable item in the second window and is located in a layer lower than the layer of the selected selectable item in the second window by one layer in the relation information;

the display control unit is further configured to perform a fourth step changing and displaying the selectable items displayed in the third window after changing and displaying the selectable items displayed in the second window, if one of the selectable items is newly selected in the first window while the first window, the second window and the third window are displayed; and the fourth step (a) changes the selectable items displayed in the second window to selectable items that are related with the newly selected selectable item in the first window and are located in a layer lower than the layer of the newly selected selectable item in the first window by one layer in the relation information, and (b) changes the selectable items displayed in the third window to selectable items that are related with a predetermined one of the selectable items displayed in the second window and are located in a layer lower than the layer of the predetermined selectable item in the second window by one layer in the relation information.

2. The electronic apparatus according to claim 1, wherein:
the display control unit is further configured to perform a fifth step changing and displaying the selectable items displayed in the second window, if one of the plural selectable items is newly selected in the first window while the first window and the second window are displayed; and the fifth step changes the selectable items displayed in the second window to selectable items that are related with the newly selected selectable item and are located in a layer lower than the layer of the newly selected selectable item by one layer in the relation information.

3. The electronic apparatus according to claim 2, further comprising:
an operation receiving unit configured to receive a gesture operation based on a trace of a position touched by a user on the display unit;

wherein the display control unit is further configured to cause the display unit to display a line image from a first starting position to a first end position, and the first starting position is in a display area of the selected selectable item in the first window, and the first end position is on an outer edge of the second window; and the display control unit is further configured to identify as the newly selected item a selectable item displayed at an end position of a swipe operation started from the first starting position and perform the third step if the operation receiving unit receives the swipe operation.

4. The electronic apparatus according to claim 1, wherein:
the display control unit is further configured to perform a sixth step changing and displaying the selectable items displayed in the third window, if one of the selectable items is newly selected in the second window while the first window, the second window and the third window are displayed; and the sixth step changes the selectable items displayed in the third window to selectable items that are related with the newly selected selectable item and are located in a layer lower than the layer of the newly selected selectable item by one layer in the relation information.

5. The electronic apparatus according to claim 4, further comprising:
an operation receiving unit configured to receive a gesture operation based on a trace of a position touched by a user on the display unit;

wherein the display control unit is further configured to cause the display unit to display a line image from a second starting position to a second end position, and the second starting position is in a display area of the selected selectable item in the second window, and the second end position is on an outer edge of the third window; and the display control unit is further configured to identify as the newly selected item a selectable item displayed at an end position of a swipe operation started from the second starting position and perform the fifth step if the operation receiving unit receives the swipe operation.

6. The electronic apparatus according to claim 1, wherein:
the display control unit is further configured to cause the display unit to display a line image from a first starting position to a first end position; and the first starting position is in a display area of the selected selectable item in the first window, and the first end position is on an outer edge of the second window.

7. The electronic apparatus according to claim 1, wherein:
the display control unit is further configured to cause the display unit to display a line image from a second starting position to a second end position; and the second starting position is in a display area of the selected selectable item in the second window, and the second end position is on an outer edge of the third window.

8. The electronic apparatus according to claim 1, further comprising:
an operation receiving unit configured to receive a gesture operation based on a trace of a position touched by the user on the display unit;

wherein the display control unit is further configured to cause the display unit to display a line image from a first starting position to a first end position, and the first starting position is in a display area of the selected selectable item in the first window, and the first end position is on an outer edge of the second window; and the display control unit is further configured to identify as the newly selected item a selectable item displayed at an end position of a swipe operation started from the first starting position and perform the sixth step if the operation receiving unit receives the swipe operation.

9. An image forming system, comprising:
an electronic apparatus; and
an image forming apparatus configured to form an image on a paper sheet;
wherein the electronic apparatus comprises:
- a display unit;
- a memory unit configure to store relation information to relate selectable items to be selected by a user in a layered tree structure; and
- a display control unit configured to perform a first step and a second step;

wherein the first step causes the display unit to display a first window in which selectable items in a layer is displayed so as to enable the user to select one of the selectable items; and the second step is performed if one of the selectable items is selected in the first window;

wherein the second step causes the display unit to display a second window in which selectable items are displayed so as to enable the user to select one of the selectable items in the second window while the selectable items are displayed in the first window so as to enable the user to select one of the selectable items in the first window also; the selectable items displayed in the second window are related with the selected selectable item in the first window and are located in a layer lower than the layer of the selected selectable item in the first window by one layer in the relation information;

the selectable items in the first window include an item to be selected by the user to cause the image forming unit to form an image on a sheet;

wherein the display control unit is further configured to perform a third step if one of the selectable items is selected in the second window; the third step causing the display unit to display a third window in which selectable items are displayed so as to enable the user to select one of the selectable items in the third window while the selectable items are displayed in the first and second windows so as to enable the user to select one of the selectable items in the first window and the second window also;

the selectable items displayed in the third window are related with the selected selectable item in the second window and is located in a layer lower than the layer of the selected selectable item in the second window by one layer in the relation information;

the display control unit is further configured to perform a fourth step changing and displaying the selectable items displayed in the third window after changing and displaying the selectable items displayed in the second window, if one of the selectable items is newly selected in the first window while the first window, the second window and the third window are displayed; and the fourth step (a) changes the selectable items displayed in the second window to selectable items that are related with the newly selected selectable item in the first window and are located in a layer lower than the layer of the newly selected selectable item in the first window by one layer in the relation information, and (b) changes the selectable items displayed in the third window to selectable items that are related with a predetermined one of the selectable items displayed in the second window and are located in a layer lower than the layer of the predetermined selectable item in the second window by one layer in the relation information.

* * * * *